(12) United States Patent
Tobaru et al.

(10) Patent No.: US 7,690,684 B2
(45) Date of Patent: Apr. 6, 2010

(54) VEHICLE OCCUPANT PROTECTION APPARATUS AND STARTUP METHOD OF SAME

(75) Inventors: Shigeo Tobaru, Wako (JP); Kazuya Yoshida, Wao (JP)

(73) Assignee: Honda Motor Co., Ltd., Tokyo (JP)

( * ) Notice: Subject to any disclaimer, the term of this patent is extended or adjusted under 35 U.S.C. 154(b) by 602 days.

(21) Appl. No.: 11/470,425

(22) Filed: Sep. 6, 2006

(65) Prior Publication Data
US 2007/0052226 A1 Mar. 8, 2007

(30) Foreign Application Priority Data
Sep. 7, 2005 (JP) ............................. 2005-259615
Sep. 7, 2005 (JP) ............................. 2005-259640

(51) Int. Cl.
*B60R 21/13* (2006.01)
(52) U.S. Cl. .................................... 280/756; 280/730.1
(58) Field of Classification Search ................. 280/756, 280/730.1, 730.2
See application file for complete search history.

(56) References Cited

U.S. PATENT DOCUMENTS

| | | | | |
|---|---|---|---|---|
| 3,804,435 | A | * | 4/1974 | See et al. ..................... 280/733 |
| 5,224,735 | A | * | 7/1993 | Jambor et al. ................ 280/756 |
| 5,921,576 | A | * | 7/1999 | Sinnhuber ................ 280/730.2 |
| 5,957,493 | A | * | 9/1999 | Larsen et al. ............ 280/743.1 |
| 6,773,031 | B2 | * | 8/2004 | Haig .......................... 280/749 |
| 6,817,626 | B2 | * | 11/2004 | Boll et al. ................ 280/730.1 |
| 7,413,215 | B2 | * | 8/2008 | Weston et al. ........... 280/730.2 |
| 2002/0125690 | A1 | * | 9/2002 | Boll et al. ................ 280/730.1 |
| 2003/0107209 | A1 | * | 6/2003 | Haig .......................... 280/749 |
| 2005/0057024 | A1 | * | 3/2005 | Weston et al. ........... 280/730.2 |

FOREIGN PATENT DOCUMENTS

| | | |
|---|---|---|
| DE | 2041741 | 2/1972 |
| DE | 4426733 | 2/1995 |
| DE | 19806766 | 8/1999 |
| DE | 19838989 | 11/1999 |
| DE | 10019894 | 10/2001 |
| DE | 10039810 | 2/2002 |
| DE | 10039807 | 5/2002 |
| DE | 10063765 | 7/2002 |
| JP | 03-000547 | 1/1991 |
| JP | 2001-354104 | 12/2001 |
| WO | 01/74625 | 10/2001 |

* cited by examiner

*Primary Examiner*—Paul N Dickson
*Assistant Examiner*—Drew Brown
(74) *Attorney, Agent, or Firm*—Rankin, Hill & Clark LLP

(57) ABSTRACT

An apparatus for protecting occupants when a vehicle having an openable and closeable roof overturns, which apparatus includes an occupant rollover protection member that supports a vehicle frame when the vehicle overturns, and first buffering members that buffer the occupants. A first buffering member control unit controls the deployment of the first buffering members on the basis of information from a vehicle state detection mechanism that detects the behavior of the vehicle.

5 Claims, 19 Drawing Sheets

VEHICLE OCCUPANT PROTECTION APPARATUS AND STARTUP METHOD OF SAME

FIELD OF THE INVENTION

The present invention relates to a vehicle occupant protection apparatus and to a startup method for operating an airbag or an occupant-protecting bar mechanism in a vehicle having an open roof, in cases in which an occupant must be protected when the vehicle is overturned or tilted.

BACKGROUND OF THE INVENTION

Occupant protection apparatuses are used in vehicles having open roofs to protect the occupants when the vehicle is overturned. For example, a roll bar (occupant-protecting bar mechanism) disclosed in the Specification of German Patent No. 19838989 is described herein.

A conventional roll bar is capable of moving and is used to maintain a space between the occupant and the ground when the vehicle is overturned.

However, in cases in which the occupant is either not wearing a seatbelt or is not wearing a seatbelt properly, it is possible that the occupant cannot be sufficiently restrained. This results in problems in which the protective capacity of the roll bar is reduced.

Also, even if a space is maintained above the occupant by the roll bar, the occupant is jolted to the left or to the right when the vehicle is overturned as a result of a side impact or the like, and the restraining force of the seatbelt against one of the occupant's shoulders may not be sufficient. This results in problems in which the protective capacity of the roll bar is reduced.

SUMMARY OF THE INVENTION

According to a first aspect of the present invention, there is provided an occupant protection apparatus for a vehicle in which at least part of a roof can be opened and closed is provided, the apparatus comprising an occupant rollover protection member that is disposed behind a front pillar for supporting the windshield and that supports a vehicle frame when a vehicle overturns, first buffering members that are disposed on the occupant rollover protection member and that provide buffering action for an occupant, and a first buffering member control unit that is disposed on the vehicle and that controls the deployment of the first buffering members on the basis of information from a vehicle state detection mechanism for detecting the behavior of the vehicle.

Thus, in the first aspect of the present invention, the opening in the roof can be covered by disposing the first buffering members (second airbag main bodies) on the occupant rollover protection member and deploying the first buffering members forward from the rear of the passenger compartment. In other words, the first buffering members (second airbag main bodies) are deployed when the vehicle overturns while the roof is open, the advantages of which are that the occupants can be more reliably protected, debris can be prevented from entering the vehicle, and the capacity to protect the vehicle occupants can be improved.

It is preferable that the occupant rollover protection member be capable of moving from a storage position to an area adjacent to the head of an occupant, and that this member comprise an occupant roll protection member startup control unit for controlling the movable occupant rollover protection member on the basis of information from the vehicle state detection mechanism. As a result, the rising of the occupant rollover protection member can be controlled, as can the deployment of the airbag main body disposed in the movable occupant rollover protection member. Therefore, the capacity to protect the vehicle occupants can be improved more than in an occupant rollover protection member that does not have an airbag main body.

It is preferable that the occupant protection apparatus comprise an actuation detecting mechanism for detecting the operation of the movable occupant rollover protection member. This arrangement has advantages in that the buffering members (airbag main bodies) can be actuated after the occupant rollover protection member is completely raised from the storage position to an area adjacent to the head of the occupant (support position).

It is preferable that the occupant protection apparatus comprise second buffering members that are disposed in an area adjacent to the windshield and that provide buffering action for occupants, and a second buffering member control unit for controlling the deployment of the second buffering members on the basis of information from the vehicle state detection mechanism. As a result, the opening in the roof can be covered by deploying the second buffering members (first airbag main bodies) backward from the front of the passenger compartment in the windshield. In other words, deploying the second buffering members (first airbag main bodies) when the vehicle overturns while the roof is open has advantages in that the occupants on the driver side and the passenger side can be more reliably protected, debris can be prevented from entering the vehicle, and the capacity to protect the vehicle occupants can be improved.

It is preferable that the occupant protection apparatus comprise third buffering members that are disposed in an area adjacent to a door opening of the vehicle and that are deployed to the sides of the occupants, and a third buffering member control unit for controlling the deployment of the third buffering members on the basis of information from the vehicle state detection mechanism. As a result, this arrangement has advantages in that the occupants can be restrained from moving to the sides, and debris can be prevented from entering the vehicle from the sides.

Also, the spaces to the sides of the occupants and the spaces above their heads are blocked off and force from the sides and from above is buffered by the third buffering members. Therefore, it is possible to provide better protection capacity when the vehicle overturns, during which time the locations subjected to force change quickly.

According to a second aspect of the present invention, a startup method for a vehicle occupant protection apparatus is provided for protecting a occupant by detecting the behavior of a vehicle in which at least part of the roof can be opened and closed, and controlling a buffering member that buffers the occupant when the vehicle is overturning; wherein the buffering member is disposed in an occupant rollover protection member that supports a frame of the vehicle; collisions, overturning, and other such behavior of the vehicle are detected by a vehicle state detection mechanism attached to the vehicle frame; an occupant roll protection member startup control unit determines whether or not overturn information from the vehicle state detection mechanism exceeds a specific value; startup signals are output in cases in which the overturn information exceeds the specific value; and drive force generating means of a buffer mechanism that deploys the buffering member into a deployed position are controlled based on the startup signals.

Thus, in the second aspect of the present invention, when the vehicle begins to overturn, the deployed buffering members (airbag main bodies) are deployed between the occupants and the ground to cushion the occupants, which has advantages in that the heads of the occupants can be more reliably protected.

Also, the occupant rollover protection member having an integrally disposed buffering mechanism is assembled on the vehicle frame, and the apparatus is therefore easily assembled on the vehicle frame.

According to a third aspect of the present invention, a startup method for a vehicle occupant protection apparatus is provided for protecting a occupant by detecting the behavior of a vehicle in which at least part of the roof can be opened and closed, and controlling a buffering member that buffers the occupant when the vehicle is overturning; wherein the buffering member is disposed in an occupant rollover protection member that supports a frame of the vehicle; collisions, overturning, and other such behavior of the vehicle are detected by a vehicle state detection mechanism attached to the vehicle frame; an occupant roll protection member startup control unit determines whether or not overturn information from the vehicle state detection mechanism exceeds a specific value; startup signals are output in cases in which the overturn information exceeds the specific value; first drive force generating means that moves the occupant rollover protection member from a storage position to a support position are controlled based on the startup signals; and second drive force generating means of a buffer mechanism that deploys the buffering member into a deployed position are controlled based on the startup signals.

Thus, in the third aspect of the present invention, when the vehicle begins to overturn, the deployed buffering members (airbag main bodies) are deployed between the occupants and the ground to cushion the occupants, which has advantages in that the heads of the occupants can be more reliably protected.

Also, the occupant rollover protection member having an integrally disposed buffering mechanism is assembled on the vehicle frame, and the apparatus is therefore easily assembled on the vehicle frame.

Furthermore, if the occupant rollover protection member is made to be movable and the buffering member (airbag main body) is disposed in the occupant rollover protection member, then the rising of the occupant rollover protection member can be controlled, as can the deployment of the airbag main body disposed in the movable occupant rollover protection member. Therefore, the capacity to protect the vehicle occupants can be improved more than in an occupant rollover protection member that does not have an airbag main body.

It is preferable that the startup signals be composed of a first startup signal that is output to the first drive force generating means, and a second startup signal that is output to the second drive force generating means, and that the startup signals separately control the occupant rollover protection member and the buffering member. As a result, this arrangement has advantages in that independent startup conditions can be set for each startup signal. For example, the occupant rollover protection member can be made to operate repeatedly under conditions with a relatively low possibility of overturning, and the buffering member (airbag main body) can be made to deploy only when the possibility of overturning is extremely high.

Also, the startup conditions can be set independently. For example, if information on the vehicle speed is added to the operation control of the buffering member (airbag main body), then the occupant rollover protection member operates when the roll angle is high. However, even if the roll angle is high, it is possible that the buffering member (airbag main body) not be deployed when the vehicle speed is equal to or less than a specific speed.

It is preferable that the startup signals provide a specific time difference between the start of output of the first startup signal and the start of output of the second startup signal. Therefore, this arrangement has advantages in that the buffering member (airbag main body) can be deployed after the occupant rollover protection member has risen from the storage position to the support position.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

The first mode of the present invention will now be described.

Figure 1:
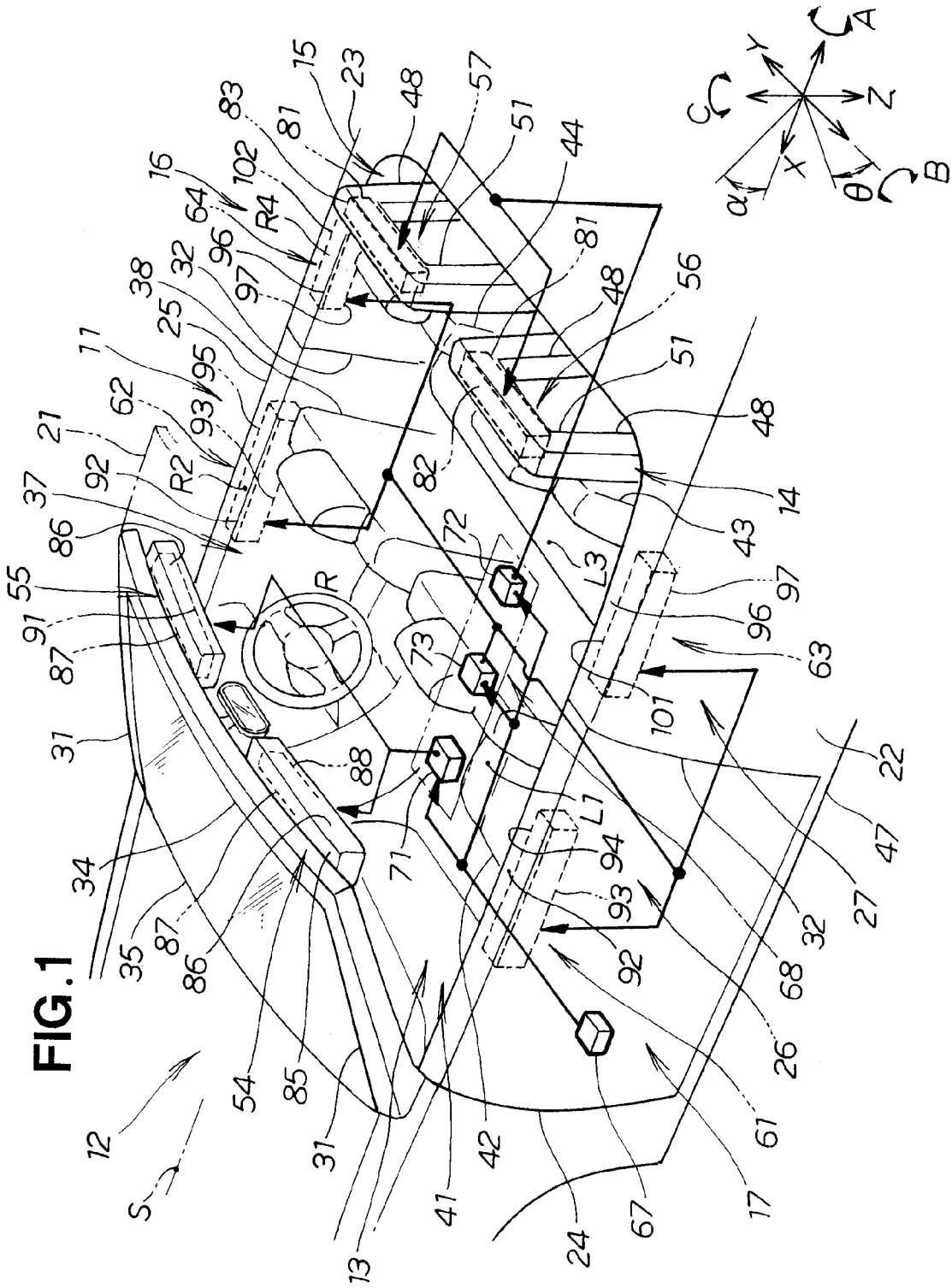
FIG. 1 is a perspective view of a vehicle occupant protection apparatus according to the present invention.

An occupant protection apparatus 11 shown in FIG. 1 is used in a vehicle 12. The apparatus comprises frame-supporting mechanisms 14, 15 disposed at the rear of a passenger compartment 13, an airbag device 16, and an airbag control device 17 for controlling the airbag device 16. A detailed description is given hereinbelow.

The vehicle 12 is a four-passenger convertible in which a roof 21 can be opened. The vehicle has a roof 21, left and right side bodies 22, 23, a left door 24, a right door 25, first-row seats 26, and second-row seats 27 disposed behind the first-row seats 26.

The left side body 22 comprises a front pillar 31 located at the front of the vehicle, and a door opening 32 where the left door 24 is attached.

The right side body 23 is symmetrical to the left side body 22 about an axis of symmetry in the center of the vehicle 12, and comprises a front pillar 31 located at the front of the vehicle, and a door opening 32 where the right door 25 is attached.

In the diagrams, the numerical symbol 34 denotes a roof front rail continuing from the tops of the front pillars 31, 31, and the numerical symbol 35 denotes a windshield.

The first-row seats 26 are composed of the seat 38 on the driver side 37, and the seat 42 on the passenger side 41. L1 denotes the side of an occupant M1 (see FIG. 4) sitting in the passenger side 41, and R2 denotes the side of an occupant M2 (see FIG. 4) sitting in the driver side 37.

In the second-row seats 27, a left rear seat 43 is disposed at the rear of the passenger side 41, and a right rear seat 44 is disposed next to the left rear seat 43. L3 denotes the side of an occupant M3 (see FIG. 4) sitting in the left rear seat 43, and R4 denotes the side of an occupant M4 (see FIG. 4) sitting in the right rear seat 44.

The axes at the lower right of FIG. 1 are coordinate axes, indicating directions of linear or rotational movement. X is an axis indicating horizontal linear movement in the longitudinal direction, Y is an axis orthogonal to the X axis, Z is a vertical axis orthogonal to both the X and Y axes, A is an axis indicating revolving movement about the X axis, B is an axis indicating revolving movement about the Y axis, and C is an axis indicating revolving movement about the Z axis.

In the left frame-supporting mechanism 14, metal tubes 48, 48 are fixed in place on the frame 47, below and to the left and right of the left rear seat 43; and an occupant rollover protection member 51 is formed in a U shape connected to these tubes 48, 48. The occupant rollover protection member 51 may include the tubes 48, 48, or the occupant rollover protection member 51 may be used alone.

The frame-supporting mechanism 15 is symmetrical to the frame-supporting mechanism 14 about an axis of symmetry S.

The occupant rollover protection member 51 includes parts such as the rest of the roof and the center pillar, which support the frame on the ground when the vehicle 12 is overturned so as to be vertically inverted.

In the airbag device 16, a passenger-side first buffering mechanism 54 and a driver-side first buffering mechanism 55 are attached to the roof front rail 34 that supports the top end of the windshield 35, a left second buffering mechanism 56 is disposed inside the occupant rollover protection member 51 of the left rear frame-supporting mechanism 14, and a right second buffering mechanism 57 is disposed inside the occupant rollover protection member 51 of the right rear frame-supporting mechanism 15.

Also in the airbag device 16, a left-door third buffering mechanism 61 is disposed inside the left door 24, a right-door third buffering mechanism 62 is disposed inside the right door 25, a left rear third buffering mechanism 63 is disposed inside the left side body 22, and a right rear third buffering mechanism 64 is disposed inside the right side body 23. The airbag device is controlled by the airbag control device 17.

The airbag control device 17 is disposed in the vehicle 12. The device comprises a vehicle state detection mechanism 67 for detecting when the vehicle 12 has collided or overturned, and a control mechanism 68 for controlling the airbag device 16 on the basis of information from the vehicle state detection mechanism 67.

The vehicle state detection mechanism 67 detects the state of the vehicle 12 when the vehicle 12 is overturned (in the A or B axis direction) or experiencing a collision. The mechanism detects the acceleration (e.g., in the X axis direction), the roll angle $\theta$ (in the A axis direction), the slip angle, the pitch angle $\alpha$ (in the B axis direction), and the vehicle speed V. The design of the vehicle state detection mechanism is arbitrary.

The control mechanism 68 determines whether or not there is a possibility that the vehicle 12 will overturn, and also whether or not the vehicle actually has overturned, on the basis of overturn information from the vehicle state detection mechanism 67. The control mechanism operates (deploys) the airbag device 16, and the design of the mechanism is arbitrary.

The control mechanism 68 also determines whether or not a front collision has occurred, and also whether or not a side collision has occurred, on the basis of collision information from the vehicle state detection mechanism 67; and operates (deploys) the airbag device 16.

Furthermore, the control mechanism 68 is composed of a first buffering member control unit 71 for controlling the passenger-side first buffering mechanism 54 and the driver-side first buffering mechanism 55; a second buffering member control unit 72, which is a buffering member control unit, for controlling the left second buffering mechanism 56 disposed inside the left occupant rollover protection member 51, and the right second buffering mechanism 57 disposed inside the right occupant rollover protection member 51; and a third buffering member control unit 73 for controlling the third buffering mechanisms 61 to 64.

The control mechanism 68 has an overturned operating mode and a side-impact operating mode, which are set as necessary.

The overturn information is composed of the roll angle $\theta$ and the pitch angle $\alpha$. This information may also include the vehicle speed V.

Figure 2:
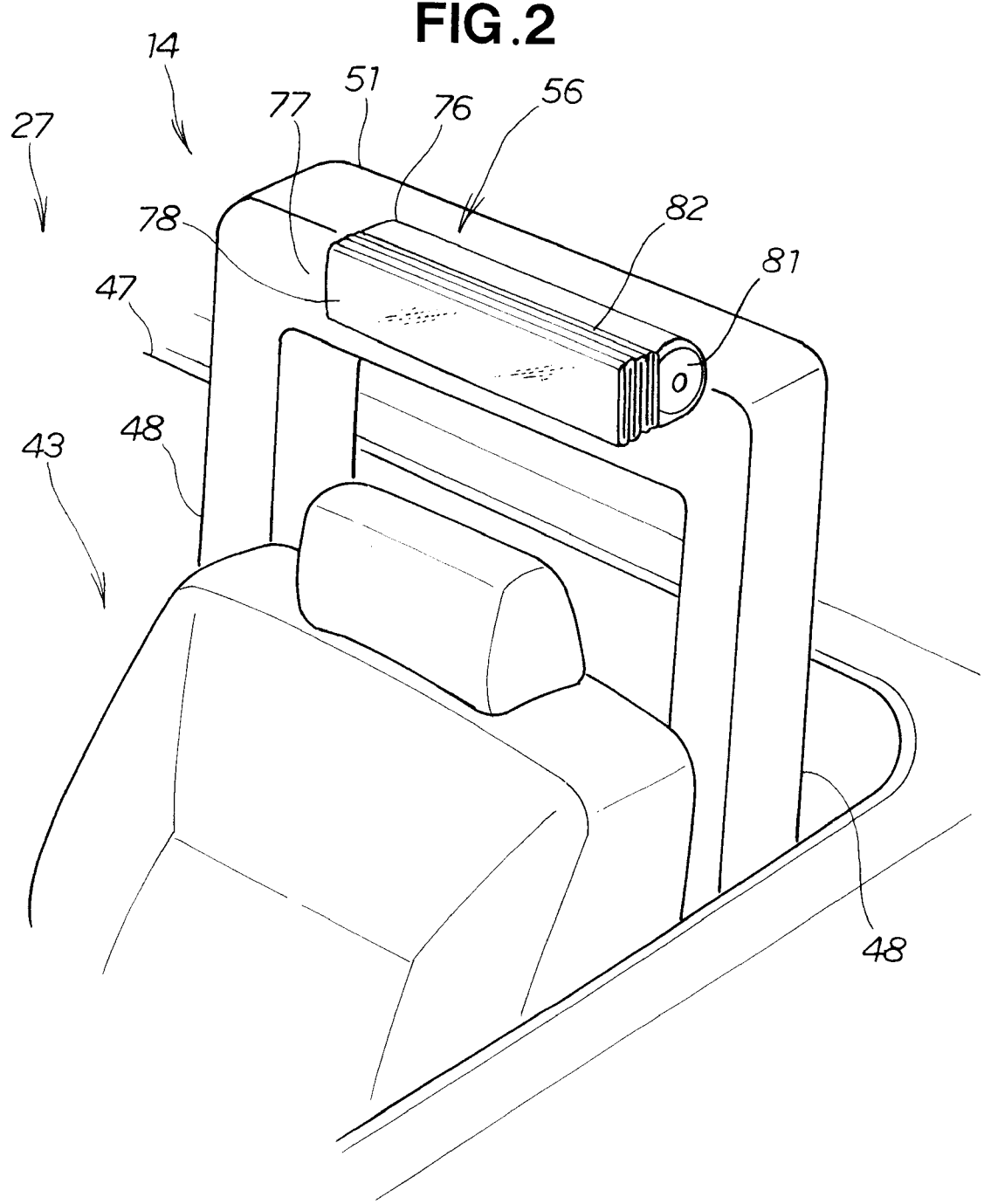
FIG. 2 is a diagram describing an airbag device in the vehicle occupant protection apparatus according to the present invention.

FIG. 2 shows the left second buffering mechanism 56, with a transparent depiction of the occupant rollover protection member 51 of the left rear frame-supporting mechanism 14.

In the second buffering mechanism 56, a metal case 76 is integrally attached to the occupant rollover protection member 51, a plastic decorative panel 77 is attached to the case 76, and an opening cover 78 is formed in the case 76 and the decorative panel 77. The case accommodates an inflator (gas generator) 81 and a second airbag main body 82, which is a first buffering member deployed by the reaction gas from the inflator (gas generator) 81.

The inflator (gas generator) 81 is a conventional inflator, and is substantially similar to the inflator disposed in an instrument panel on the passenger side, for example.

The second buffering mechanism 57 (see FIG. 1) is symmetrical with the second buffering mechanism 56 about the axis of symmetry S, and has a second airbag main body 83 (identical to the second airbag main body 82) as a first buffering member.

Next, the first buffering mechanisms 54, 55 and the third buffering mechanisms 61 to 64 will be described while also referring to FIG. 1.

The first buffering mechanisms 54, 55 and the third buffering mechanisms 61 to 64 are substantially identical to the second buffering mechanisms 56, 57 previously described.

In the first buffering mechanism 54, a metal case is integrally attached to the roof front rail 34, a plastic decorative panel 85 is attached to the case, and an opening cover 86 is formed in the case and the decorative panel 85. The case accommodates an inflator (gas generator) 87 and a first airbag main body 88, which is a second buffering member deployed by the reaction gas from the inflator (gas generator) 87.

The first buffering mechanism 55 is symmetrical with the first buffering mechanism 54 about the axis of symmetry S, and has a first airbag main body 91 (identical to the first airbag main body 88) as a second buffering member.

The third buffering mechanism 61 is attached to the inner panel of the left door 24 so that the metal case faces an opening cover 92 in the left door 24. The case accommodates an inflator (gas generator) 93 and a third front airbag main body 94, which is a third buffering member deployed by the reaction gas from the inflator (gas generator) 93.

The third buffering mechanism 62 is symmetrical with the third buffering mechanism 61 about the axis of symmetry S, and has a third front airbag main body 95 (identical to the third front airbag main body 94) as a third buffering member.

The third buffering mechanism 63 is attached to a panel of the left side body 22 so that the metal case faces an opening cover 96 of the side body 22. The case accommodates an inflator (gas generator) 97 and a third rear airbag main body 101, which is a third buffering member deployed by the reaction gas from the inflator (gas generator) 97.

The third buffering mechanism 64 is symmetrical with the third buffering mechanism 63 about the axis of symmetry S, and has a third rear airbag main body 102 (identical to the third rear airbag main body 101) as a third buffering member.

In the overturned operating mode, the first, second, and third buffering member control units 71, 72, 73 determine that the vehicle has overturned; the first buffering member control unit 71 deploys the second buffering members (first airbag main bodies) 88, 91; the second buffering member control unit 72 deploys the first buffering members (second airbag main bodies) 82, 83; and the third buffering member control unit 73 deploys the third buffering members (third front and rear airbag main bodies) 94, 95, 101, 102.

In the side-impact operating mode, the third buffering member control unit 73 is determined to be experiencing a side collision, and only the third buffering members (third front and rear airbag main bodies) 94, 95, 101, 102 are deployed.

Next, the configuration of the first through third airbag main bodies will be described in detail, using the deployed first through third airbag main bodies shown in FIG. 5.

The left front first airbag main body 88 has a rear overlapping part 106 formed at the rear end, and a left overlapping part 107 formed at the left end.

The right front first airbag main body 91 has a rear overlapping part 108 formed at the rear end, and a right overlapping part 111 formed at the right end.

The left rear second airbag main body 82 has a front overlapping part 112 formed at the front end so as to overlap with the rear overlapping part 106, and a left overlapping part 113 formed at the left end.

The right rear second airbag main body 83 has a front overlapping part 114 formed at the front end so as to overlap with the rear overlapping part 108, and a right overlapping part 115 formed at the right end.

The third front airbag main body 94 has a top overlapping part 116 formed at the top end so as to overlap with the left overlapping part 107.

The third front airbag main body 95 has a top overlapping part 117 formed at the top end so as to overlap with the right overlapping part 111.

The third rear airbag main body 101 has a top overlapping part 118 formed at the top end so as to overlap with the left overlapping part 113.

The third rear airbag main body 102 has a top overlapping part 121 formed at the top end so as to overlap with the right overlapping part 115.

A four-passenger automobile (convertible) was described herein as an example, but the occupant protection apparatus 11 may also be used in a two-passenger automobile such as a roadster.

In the case of a roadster, modifications are made to accommodate two occupants. Naturally, the occupant rollover protection member 51 is disposed behind the first-row seats 26, the length of the first airbag main body 88 (in the X axis direction) and the length of the second airbag main body 82 (in the X axis direction) are reduced by about 50%, and the third airbag main bodies 101, 102 are omitted.

Next, the mechanism for deploying the first, second, and third buffering members (airbag main bodies) of the occupant protection apparatus 11 will be described with reference to FIGS. 3 through 5.

First, the deployment of only the first airbag main bodies 88, 91 will be described. Next, a case will be described in which the second airbag main bodies 82, 83 are deployed simultaneously with the first airbag main bodies 88, 91. Then, a case will be described in which the first airbag main bodies 88, 91, the second airbag main bodies 82, 83, and the third front and rear airbag main bodies 94, 95, 101, 102 are all deployed at substantially the same time. Lastly, the deployment of only the third front and rear airbag main bodies 94, 95, 101, 102 will be described.

Figure 3:
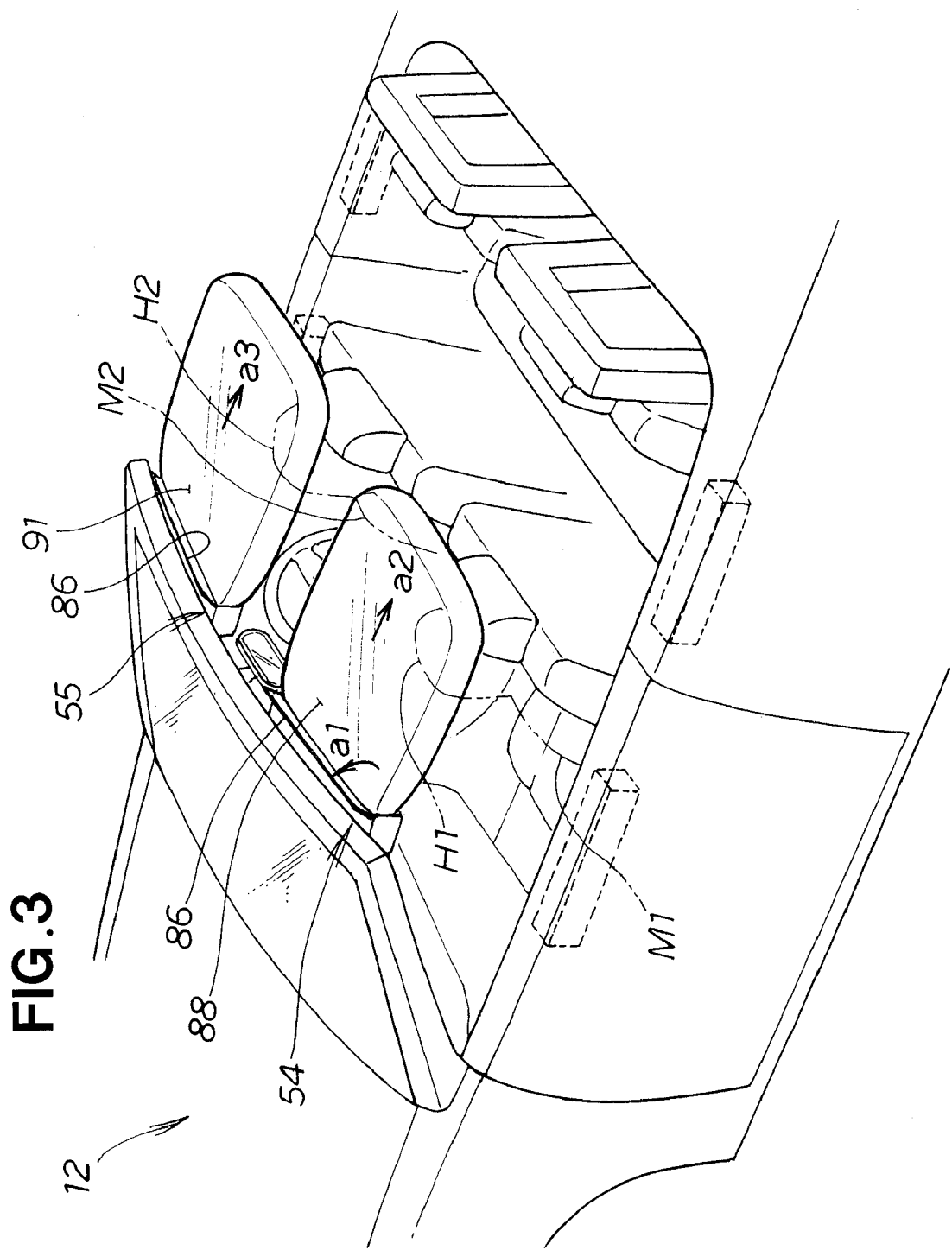
FIG. 3 is a diagram describing a mechanism for deploying the second buffering member from the vicinity of the windshield in the vehicle occupant protection apparatus according to the present invention.

FIG. 3 shows the deployment of the first airbag main bodies 88, 91 of the occupant protection apparatus of the present invention. The following description also refers to FIGS. 1 and 2.

When the vehicle 12 is experiencing a collision, or when the vehicle 12 has begun to overturn, the first airbag main bodies 88, 91 expand so as to cover the top of the head H1 of the occupant M1 and the top of the head H2 of the occupant M2.

Specifically, when a front, side, or other type of collision occurs, the first buffering member control unit 71 determines that a collision has occurred and outputs operating information on the basis of collision information from the vehicle state detection mechanism 67. The inflator 87 of the first buffering mechanism 54 operates based on this operating information and injects reaction gas into the first airbag main body 88. The first airbag main body 88 therefore ruptures the tear lines of the opening cover 86 that are formed in the case and decorative panel 85. The opening cover 86 is opened as shown by the arrow a1, and the airbag is deployed as shown by the arrow a2 into the space above the head H1 of the occupant M1.

The first buffering member control unit 71 deploys the first airbag main body 91 of the right first buffering mechanism 55 into the space above the head H2 of the occupant M2 as shown by the arrow a3, with the same timing as the first airbag main body 88. This has been a description of when a front, side, or other type of collision has occurred.

Next, a case will be described in which the vehicle has begun to overturn.

When the vehicle 12 begins to overturn for any reason, the first buffering member control unit 71 determines that there is a possibility of overturning and outputs operating information on the basis of overturn information from the vehicle state detection mechanism 67. The inflator 87 of the left first buffering mechanism 54 operates based on this operating information. Then, as has been described previously, the first airbag main body 88 is deployed into the space above the head H1 of the occupant M1 as shown by the arrow a2. At the same time, the first airbag main body 91 is deployed into the space above the head H2 of the occupant M2 with the same timing as the first airbag main body 88, as shown by the arrow a3.

The following is a description of a case in which the second airbag main bodies 82, 83 are deployed at the same time as the first airbag main bodies 88, 91.

Figure 4:
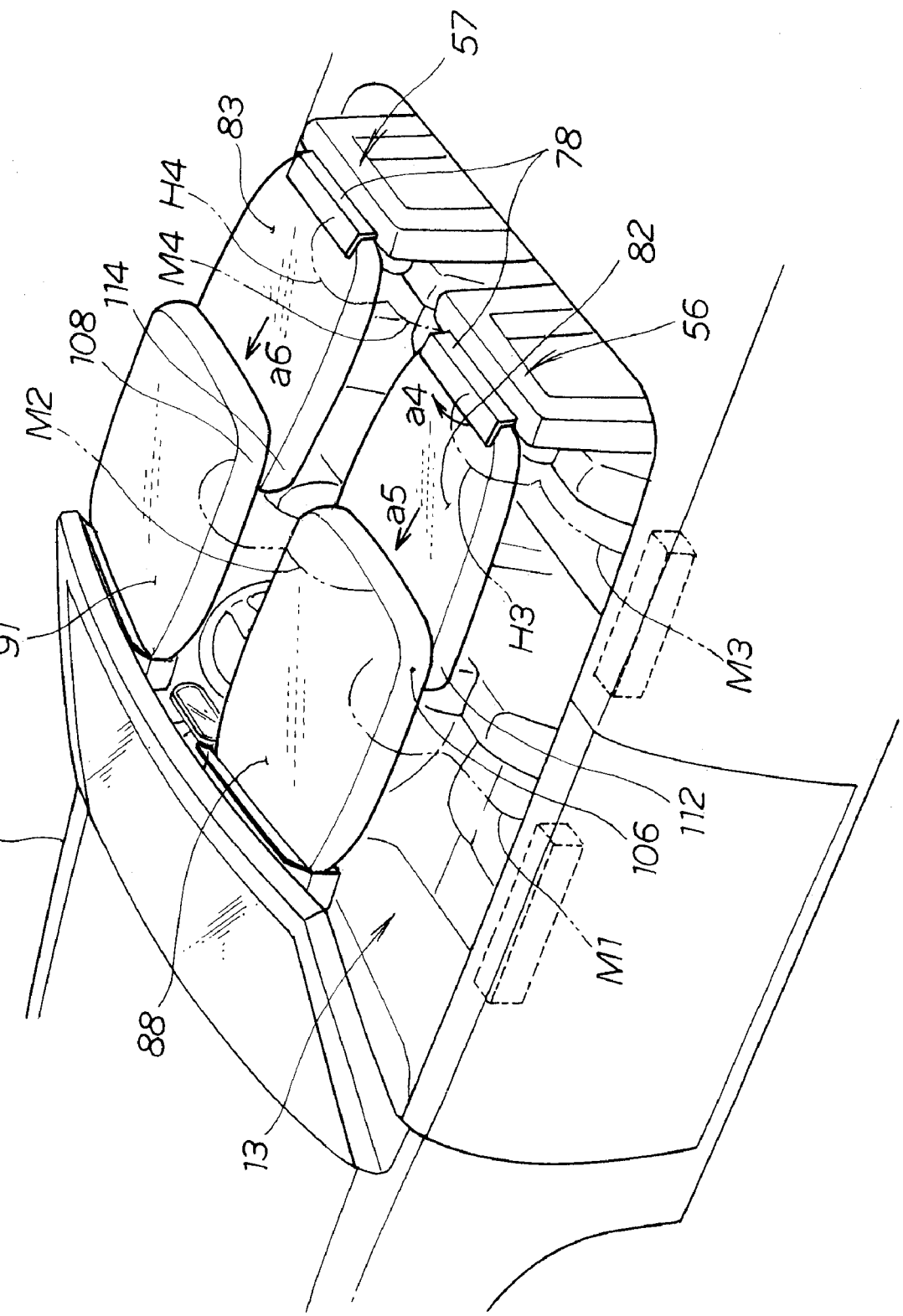
FIG. 4 is a diagram describing a mechanism for deploying the first buffering member from the occupant rollover protection member, as well as a mechanism for deploying the second buffering member at substantially the same time, in the vehicle occupant protection apparatus according to the present invention.

FIG. 4 shows the deployment of both the second airbag main bodies 82, 83 and the first airbag main bodies 88, 91 in the occupant protection apparatus of the present invention. The description also refers to FIGS. 1 and 2.

When a front, side, or other type of collision occurs, the second airbag main bodies 82, 83 are expanded by the second buffering member control unit 72 so as to cover the spaces above the head H3 of the occupant M3 and above the head H4 of the occupant M4. This occurs with substantially the same timing as the previously described process by which the first buffering member control unit 71 deploys the first airbag main bodies 88, 91.

Specifically, the second buffering member control unit 72 determines that a collision has occurred and outputs operating information simultaneously with the first buffering member control unit 71. The inflator 81 of the left rear second buffering mechanism 56 operates based on this operating information and injects reaction gas into the second airbag main body 82. The second airbag main body 82 therefore ruptures the tear lines in the opening cover 78. The opening cover 78 is opened as shown by the arrow a4, and the airbag is deployed as shown by the arrow a5 into the space above the head H3 of the occupant M3. The result is that the rear overlapping part 106 at the rear end of the first airbag main body 88 is laid over and overlapped on the front overlapping part 112 at the front end of the second airbag main body 82.

The second buffering member control unit 72 deploys the second airbag main body 83 of the second buffering mechanism 57 into the space above the head H4 of the occupant M4 as shown by the arrow a6, with the same timing as the second airbag main body 82. The result is that the rear overlapping part 108 at the rear end of the first airbag main body 91 is laid over and overlapped on the front overlapping part 114 at the front end of the second airbag main body 83.

The following is a description of a case in which the vehicle has begun to overturn.

The second buffering member control unit 72 determines that there is a possibility that the vehicle will overturn and outputs operating information on the basis of overturn information from the vehicle state detection mechanism 67. The inflators 81, 81 of the second buffering mechanisms 56, 57 are operated based on this operating information. The first airbag main body 88 and the second airbag main body 82 then both expand and overlap, and are deployed into the space above the head H1 of the occupant M1 and into the space above the head H3 of the occupant M3 as shown by the arrow a5, as previously described. At the same time, the first airbag main body 91 and the second airbag main body 83 both expand and overlap, and are deployed into the space above the head H2 of the occupant M2 and into the space above the head H4 of the occupant M4 as shown by the arrow a6.

Thus, in the occupant protection apparatus 11, the first airbag main bodies 88, 91 are deployed rearward from the front of the passenger compartment 13, and the second airbag main bodies 82, 83 are deployed forward from the rear of the passenger compartment 13, thus covering the opening in the roof 21.

Specifically, the heads H1 to H4 of the occupants M1 to M4 can be protected from the ground and from debris with the occupant protection apparatus 11. In other words, when the vehicle is overturned while the roof 21 is open, the airbags (first and second airbag main bodies) 88, 91, 82, 83 are deployed to more reliably protect the occupants M1 to M4, debris is prevented from entering the vehicle, and the capacity to protect the vehicle occupants M1 to M4 can be improved.

The occupant protection apparatus 11 also includes first-row seats 26 and second-row seats 27, wherein the occupant rollover protection members 51, 51 are disposed in an area adjacent to the second-row seats 27, the first buffering members (second airbag main bodies) 82, 83 are deployed above the heads H3, H4 of the occupants M3, M4 in the second-row seats 27, and the second buffering members (first airbag main bodies) 88, 91 are deployed above the heads H1, H2 of the occupants M1, M2 in the first-row seats 26. In a case of four or five occupants, the heads of the four or five occupants can therefore be protected, and the capacity to protect the heads of the four or five occupants can be improved.

With this occupant protection apparatus 11, the first airbag main body 88 and the second airbag main body 82 both expand and overlap and are deployed into the space above the head H1 of the occupant M1 in cases in which the occupant protection apparatus 11 is used in a roadster, which is a two-passenger automobile. At the same time, the first airbag main body 91 and the second airbag main body 83 both expand and overlap and are deployed into the space above the head H2 of the occupant M2. As a result, the head H1 of the occupant M1 and the head H2 of the occupant M2 can both be protected from the ground and from debris.

In other words, when the vehicle overturns while the roof 21 is open, the airbags (first and second airbag main bodies) 88, 91, 82, 83 are opened to more reliably protect the occupants M1, M2, debris is prevented from entering the vehicle, and the capacity to protect the vehicle occupants M1, M2 can be improved.

Since the occupant protection apparatus 11 comprises first buffering members (second airbag main bodies) 82, 83 and second buffering members (first airbag main bodies) 88, 91, the lengths (in the X axis direction) of the buffering members (airbag main bodies) that protect the heads of two, four, or five occupants can be reduced to reduce the size of the buffering members (airbag main bodies). Therefore, the buffering members (airbag main bodies) can be more quickly deployed, and the capacity to protect the vehicle occupants M1, M2 can be improved.

The following is a description of a case in which the first airbag main bodies 88, 91, the second airbag main bodies 82, 83, and the third front and rear airbag main bodies 94, 95, 101, 102 are deployed substantially at the same time.

Figure 5:
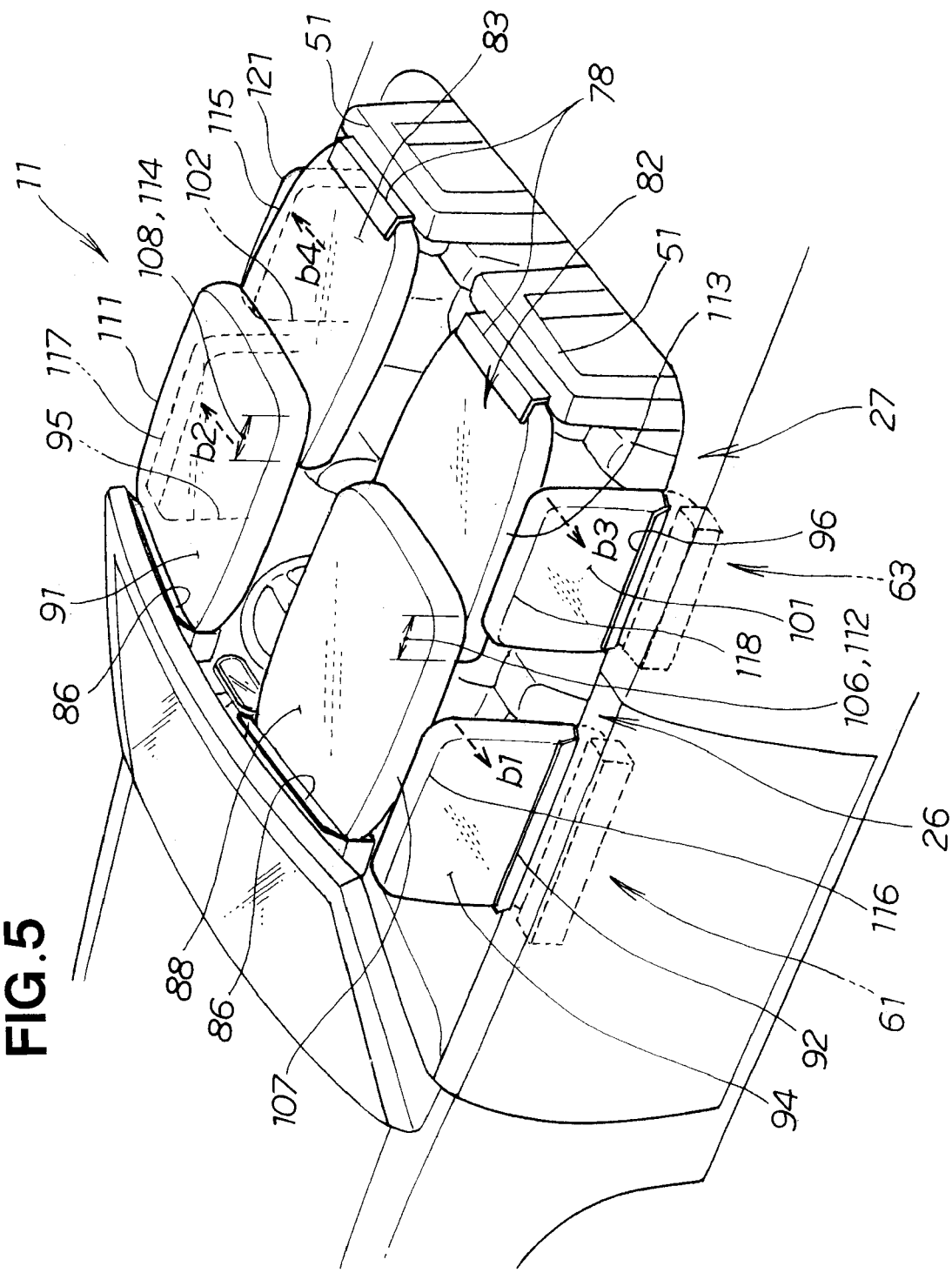
FIG. 5 is a diagram describing a mechanism for deploying the first, second, and third buffering members at substantially the same time in the vehicle occupant protection apparatus according to the present invention.

FIG. 5 shows the deployment of the third front and rear airbag main bodies 94, 95, 101, 102, and also the deployment of the first airbag main bodies 88, 91 and the second airbag main bodies 82, 83, in the occupant protection apparatus of the present invention. This description also refers to FIGS. 1, 2, and 4.

When a front, side, or other type of collision occurs, the third front and rear airbag main bodies 94, 95, 101, 102 are expanded so as to cover the side L1 of the occupant M1, the side R2 of the occupant M2, the side L3 of the occupant M3, and the side R4 of the occupant M4, respectively. These airbag main bodies are expanded by the third buffering member control unit 73 with the same timing as the operation of the first buffering member control unit 71 and the second buffering member control unit 72 previously described.

Specifically, the third buffering member control unit 73 determines that a collision has occurred and outputs operating information at the same time as the first and second buffering member control units 71, 72. The inflator 93 of the third buffering mechanism 61 inside the left door 24, the inflator 93 of the third buffering mechanism 62 inside the right door 25, the inflator 97 of the rear third buffering mechanism 63, and the inflator 97 of the third buffering mechanism 64 operate to inject reaction gas into the third front and rear airbag main bodies 94, 95, 101, 102, respectively, on the basis of the operating information. The third front and rear airbag main bodies 94, 95, 101, 102 therefore rupture the tear lines in the opening covers 92, 92, 96, 96; the opening covers 92, 92, 96, 96 are opened; and the airbag main bodies are deployed to the side L1 of the occupant M1, the side R2 of the occupant M2, the side L3 of the occupant M3, and the side R4 of the occupant M4.

The top overlapping part 116 at the top end of the third front airbag main body 94 overlaps the left overlapping part 107 at the left end of the first airbag main body 88 by a specific distance, the top overlapping part 117 at the top end of the third front airbag main body 95 overlaps the right overlapping part 111 at the right end of the first airbag main body 91 by a specific distance, the top overlapping part 118 at the top end of the third rear airbag main body 101 overlaps the left overlapping part 113 at the left end of the second airbag main body 82 by a specific distance, and the top overlapping part 121 at the top end of the third rear airbag main body 102 overlaps the right overlapping part 115 at the right end of the second airbag main body 83 by a specific distance.

The following is a description of a case in which the vehicle has begun to overturn.

The third buffering member control unit 73 determines that there is a possibility that the vehicle will overturn and outputs operating information on the basis of overturn information from the vehicle state detection mechanism 67. The inflator 93 of the third buffering mechanism 61, the inflator 93 of the third buffering mechanism 62, the inflator 97 of the third buffering mechanism 63, and the inflator 97 of the third buffering mechanism 64 operate based on this operating information. The subsequent process is as previously described.

Thus, the occupants M1 to M4 can be prevented from moving to the sides L1, R2, L3, R4 (in the direction of the arrows b1 through b4). This is because the occupant protection apparatus 11 comprises third buffering members (third front and rear airbag main bodies) 94, 95, 101, 102 that are deployed to the side L1 of the occupant M1, the side R2 of the occupant M2, the side L3 of the occupant M3, and the side R4 of the occupant M4; and also comprises a third buffering member control unit 73 for controlling the deployment of the third buffering members 96, 97, 102, 103.

Also, debris can be prevented from entering from the sides by the third buffering members (third front and rear airbag main bodies) 94, 95, 101, 102.

Since the occupant protection apparatus 11 comprises the overlapping parts 106, 108, 112, 114, 116 to 118, and 121, the number of openings between the airbag main bodies can be reduced.

Also, the capacity to protect the vehicle occupants against debris can be improved by reducing the size of the openings between the airbag main bodies.

The following is a description of a case in which only the third front and rear airbag main bodies 94, 95, 101, 102 are deployed.

When the first, second, and third buffering member control units 71, 72, 73 are set to the overturn operating mode, the second buffering members (first airbag main bodies) 88, 91, the first buffering members (second airbag main bodies) 82, 83, and the third buffering members (third front and rear airbag main bodies) 94, 95, 101, 102 are deployed, as was already described for a case in which the vehicle overturns.

When the third buffering member control unit 73 is set to the side-impact operating mode, the third buffering member control unit 73 determines that a side collision is occurring and outputs operating information solely on the basis of side collision information included in the collision information from the vehicle state detection mechanism 67. The result is that only the third front and rear airbag main bodies 94, 95, 101, 102 are deployed during a side collision, and the occupants can be protected in a more suitable manner during each type of collision. As a result, the buffering members (airbag main bodies) can be prevented from being deployed unnecessarily.

The occupant protection apparatus of the present invention was applied to an automobile having a roof that can be opened and closed in this embodiment, but can also be applied to an automobile having no roof, as well as other common vehicles.

The occupant protection apparatus of the present invention is suitable for convertibles and roadsters.

Next, a second mode of the present invention will be described.

First, an occupant protection apparatus 211 will be described in which the startup method for the vehicle occupant protection apparatus of the present invention is used.

Figure 6:
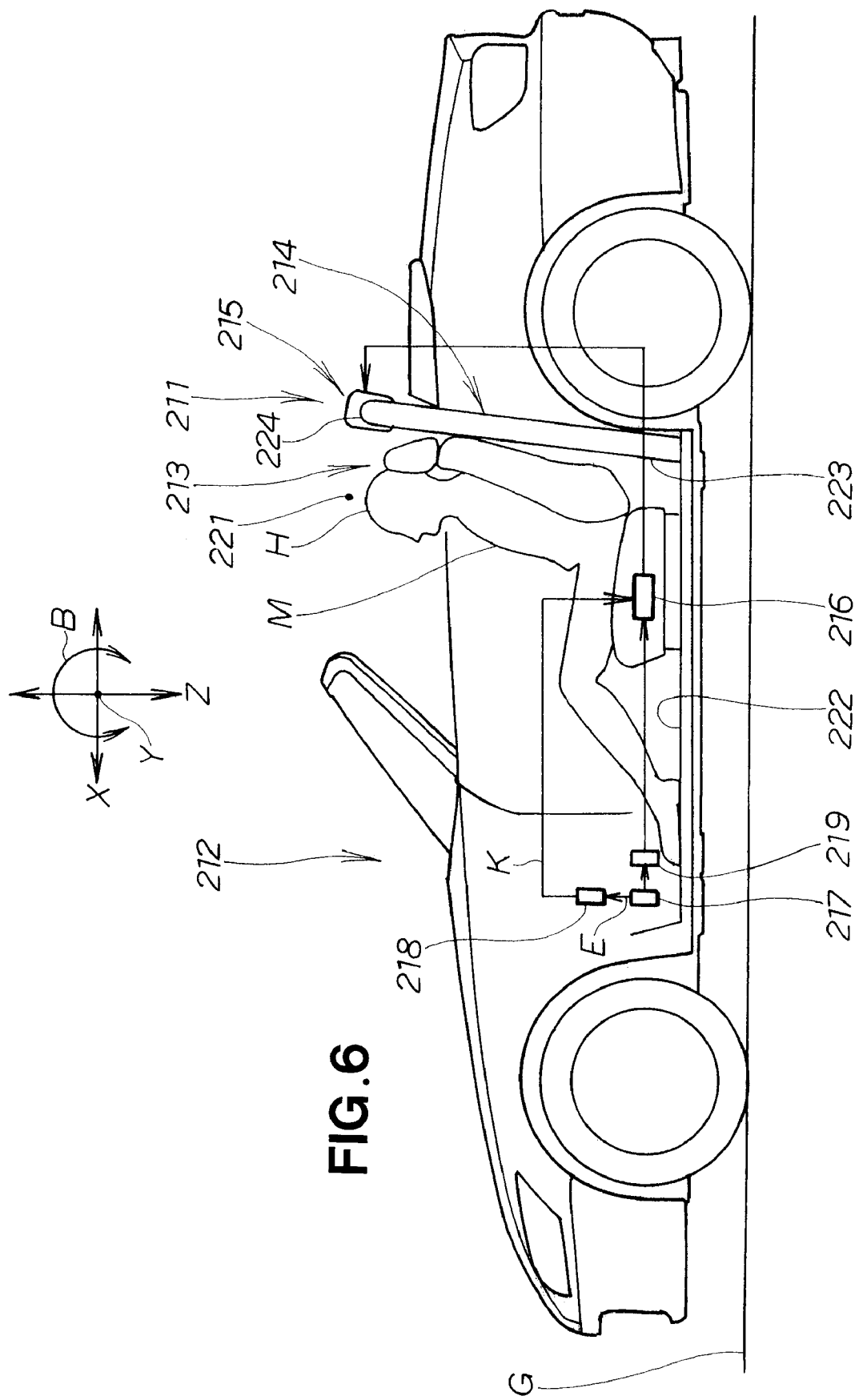
FIG. 6 is a diagram describing the startup method (first embodiment) of the vehicle occupant protection apparatus according to the present invention.

The occupant protection apparatus 211 shown in FIG. 6 is used in a vehicle 212, and comprises a frame-supporting mechanism 214 disposed on the passenger side 213, a buffer mechanism 215 disposed on the frame support mechanism 214, a buffer member control 216 disposed in the center of the vehicle 212, a vehicle state detection mechanism 217 for detecting the state of the vehicle 212, an occupant roll protection member startup control unit 218 for making determinations on the basis of information from the vehicle state detection mechanism 217, and a frame support mechanism 214 and buffer mechanism 215 similarly disposed on the driver side. The numerical symbol 219 denotes a control apparatus of the vehicle 212, and the numerical symbol 221 denotes the deployed position of the buffer mechanism 215.

The vehicle 212 is a convertible in which the roof can be opened and closed, and the buffer mechanism 215 is deployed below the roof when the roof is closed. The roof may be made of either a plastic or metal.

The axes at the top of FIG. 6 are coordinate axes, indicating directions of linear or rotational movement. X is an axis indicating horizontal linear movement in the longitudinal direction, Y is an axis orthogonal to the X axis, Z is a vertical axis orthogonal to both the X and Y axes, A (see FIG. 7) is an axis indicating revolving movement about the X axis, B is an axis indicating revolving movement about the Y axis, and C (see FIG. 7) is an axis indicating revolving movement about the Z axis.

The vehicle state detection mechanism 217 detects states of the vehicle 212, including overturning of the vehicle 212 (in the A and B axis direction) and collisions. This detection mechanism detects the acceleration (e.g., in the X axis direction), the roll angle $\theta$ (in the A axis direction; see FIG. 9), the slip angle, the pitch angle $\alpha$ (in the B axis direction, see FIG. 9), and the vehicle speed V, for example. This detection mechanism has an arbitrary design.

The occupant roll protection member startup control unit 218 determines whether or not there is a possibility that the vehicle 212 will overturn, or whether or not the vehicle actually will overturn, on the basis of overturn information from the vehicle state detection mechanism 217. This control unit also operates (deploys) the buffer mechanism 215, and has an arbitrary design.

Figure 9A:
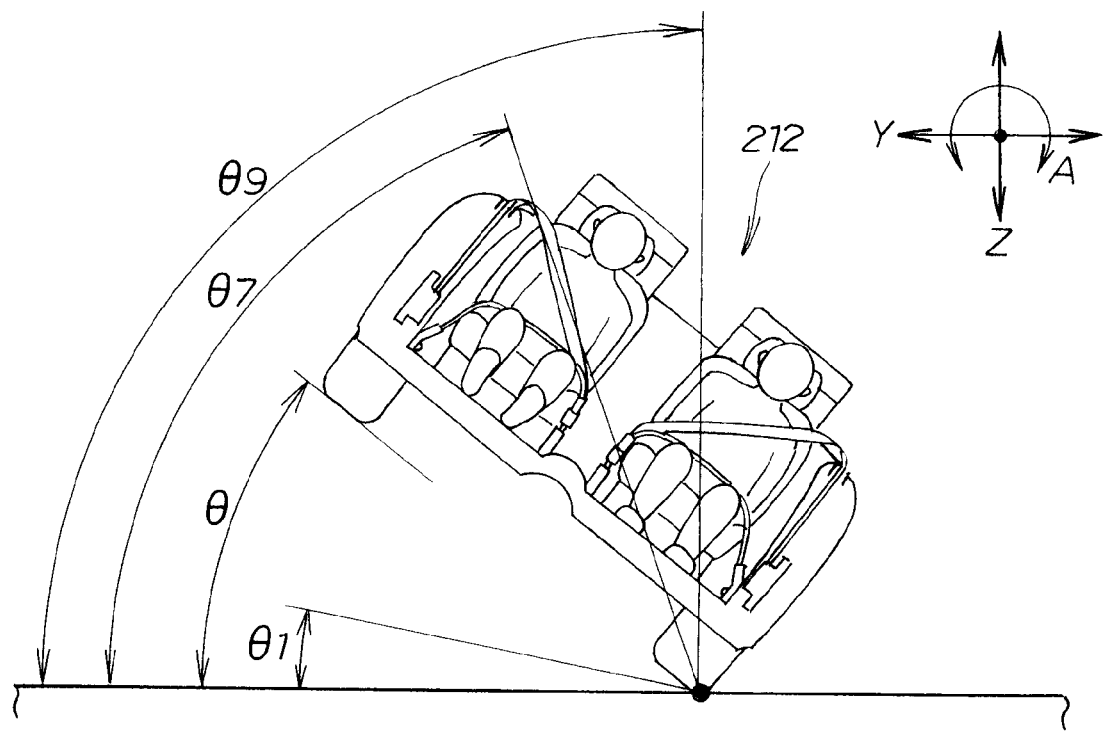
FIGS. 9A and 9B are diagrams describing the overturn information used in the startup method of the vehicle occupant protection apparatus according to the present invention.
Figure 9B:
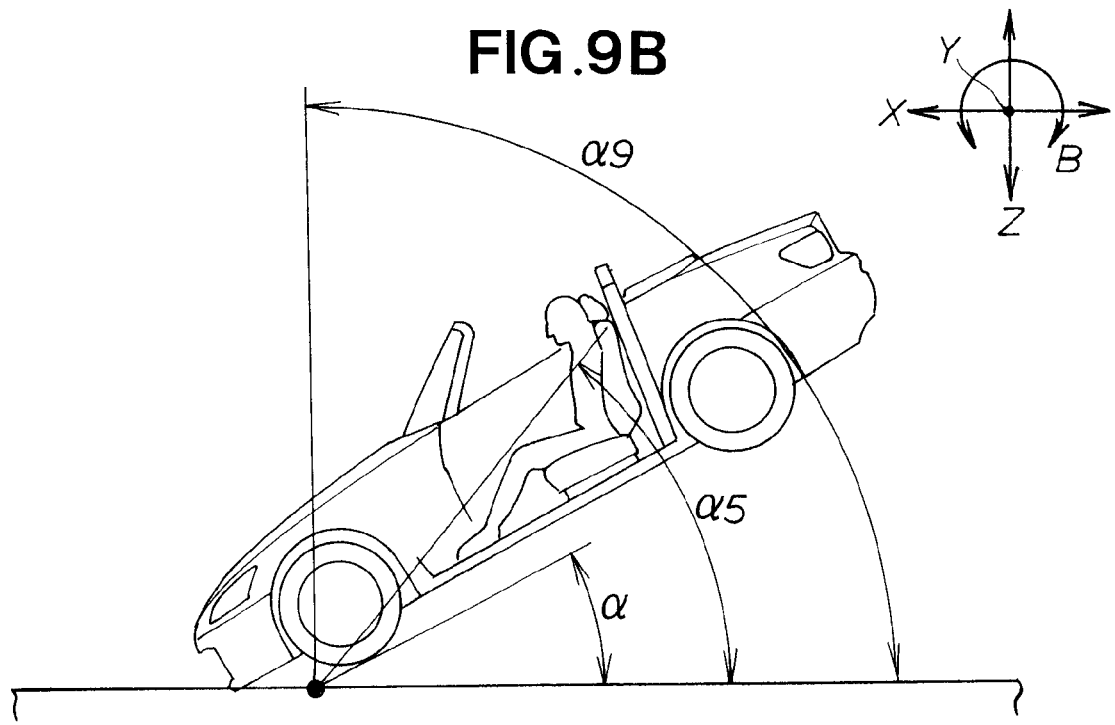

Overturn information E is composed of the roll angle $\theta$ (see FIG. 9A) and the pitch angle $\alpha$ (see FIG. 9B). This information may also include the vehicle speed V.

The frame support mechanism 214 has metal tubes 223, 223 (see FIG. 7) fixed to the vehicle frame 222 to the left and right and below the passenger side 213, and an occupant rollover protection member 224 connected to the tubes 223, 223 and formed in a U shape.

The frame support mechanism 214 has the buffer mechanism 215 integrally attached to the occupant rollover protection member 224, and is then assembled on the vehicle frame 222 in an assembly line.

Figure 7:
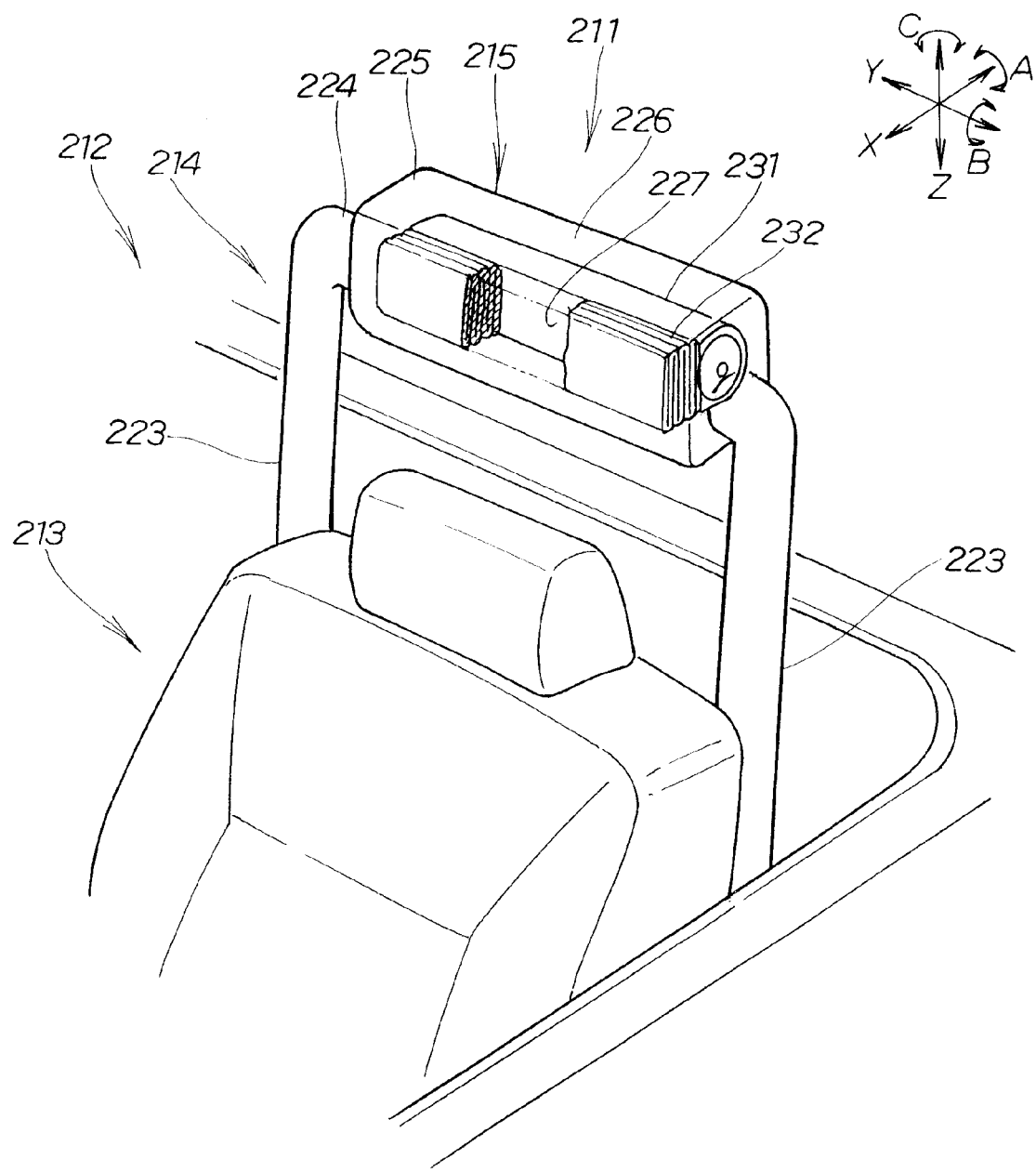
FIG. 7 is a perspective view of an occupant protection apparatus, for describing the startup method (first embodiment) of the vehicle occupant protection apparatus according to the present invention.

FIG. 7 depicts a transparent view of the buffer mechanism 215 of the occupant protection apparatus 211, in order to describe the startup method (of the first embodiment).

In the buffer mechanism 215, a metal case 225 is integrally attached to the occupant rollover protection member 224, the case 225 is covered by a plastic decorative panel 226, and an opening cover 227 is formed over the case 225 and the decorative panel 226. An airbag main body 232 is disposed within the case 225 as a buffering member that is deployed by reaction gas from an inflator (gas generator) 231, which is a drive force generating means.

The inflator (gas generator) 231 is a conventional inflator, and is substantially identical to an inflator disposed on an instrument panel on the passenger side, for example.

An occupant protection apparatus 211 intended for the passenger side 213 was described herein, but it is apparent that a frame support mechanism 214 and a buffer mechanism 215 are similarly (symmetrically about the center of the frame) disposed on the driver side.

Figure 8:
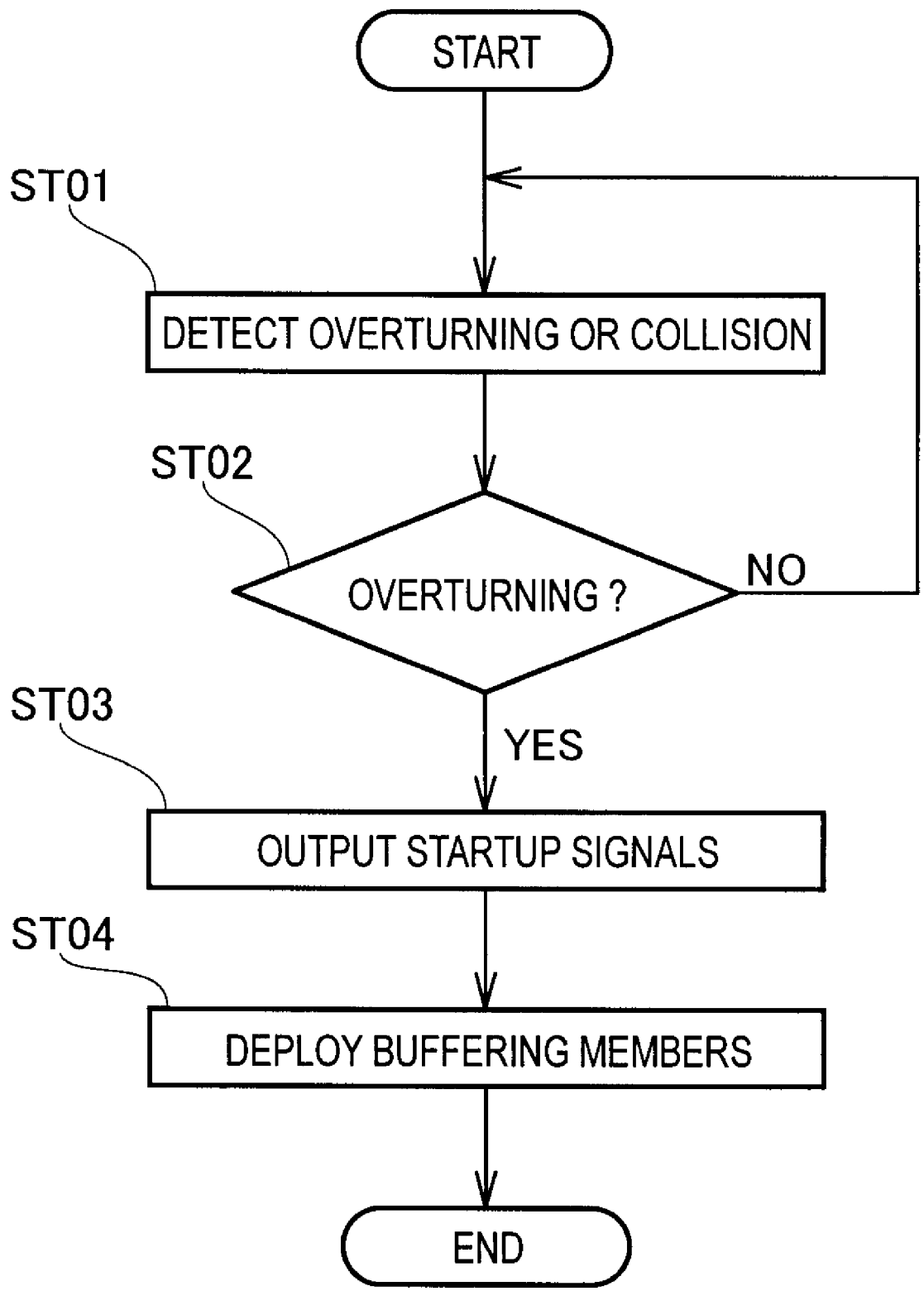
FIG. 8 is a flowchart describing the startup method (first embodiment) of the vehicle occupant protection apparatus according to the present invention.

FIG. 8 depicts a startup method (first embodiment) of an occupant protection apparatus of the present invention. STxx denotes the step number. This description also refers to FIGS. 6 and 7.

ST01: A collision or overturning of the vehicle 212 is detected by the vehicle state detection mechanism 217.

ST02: The occupant roll protection member startup control unit 218 determines whether the vehicle is overturning on the basis of overturn information E. If the vehicle is not overturning, the process returns to ST01. If the vehicle is overturning, the process advances to ST03.

ST03: The occupant roll protection member startup control unit 218 outputs a startup signal K.

ST04: The drive force generating means (inflator) 231 operates to deploy the buffering member (airbag main body) 232.

The process advances to ST03 when overturning is determined in ST02, but another possibility is for the process to advance to ST03 when a "possibility of overturning" is determined.

FIG. 9A depicts the roll angle $\theta$ of the vehicle 212 included in the overturn information.

FIG. 9B depicts the pitch angle $\alpha$ of the vehicle 212 included in the overturn information.

In FIG. 9A, the roll angle $\theta 1$ is a specific value, e.g., 10°, used when a "possibility of overturning" is determined. In other words, a "possibility of overturning" is determined when the roll angle $\theta$ exceeds $\theta 1$.

The roll angle $\theta 7$ is a specific value, e.g., 70°, used when "overturning" is determined. In other words, "overturning" is determined when the roll angle $\theta$ exceeds $\theta 7$.

The term "overturning" refers to a state in which the roll angle $\theta$ is equal to or greater than $\theta 9=90°$, or in which the vehicle 212 has turned upside-down.

In FIG. 9B, the pitch angle $\alpha 5$ is a specific value, e.g., 50°, used when a "possibility of overturning" is determined. In other words, a "possibility of overturning" is determined when the pitch angle $\alpha$ exceeds $\alpha 5$.

The pitch angle $\alpha 9$ is a specific value, e.g., 90°, used when "overturning" is determined. In other words, "overturning" is determined when the pitch angle $\alpha$ exceeds $\alpha 9$.

The overturn information E includes the roll angle $\theta$ and the pitch angle $\alpha$, but it is also acceptable for this information to include either only the roll angle $\theta$, or three or more types of information. For example, the vehicle speed V may be included.

Figure 10:
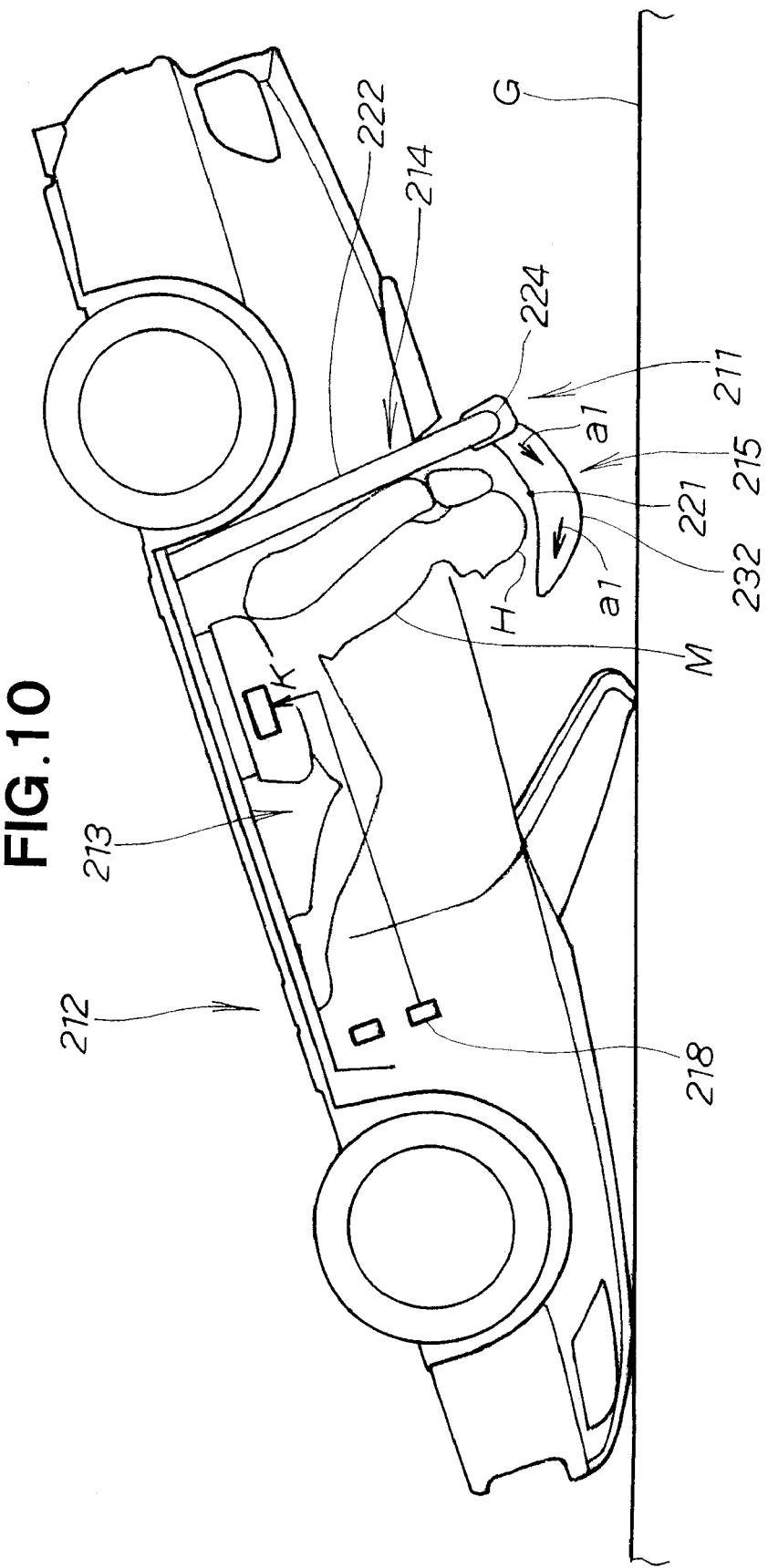
FIG. 10 is a diagram describing the state of operation according to the startup method (first embodiment) of the vehicle occupant protection apparatus according to the present invention.

FIG. 10 depicts the operating state according to the startup method (first embodiment) of the occupant protection apparatus of the present invention.

In the startup method (first embodiment) of the occupant protection apparatus, the occupant roll protection member startup control unit 218 outputs a startup signal K when the vehicle 212 begins to overturn and the overturn information E exceeds the specific value of $\theta 7$ or $\alpha 9$. The drive force generating means (inflator) 231 of the buffer mechanism 215 is actuated, and the buffering member (airbag main body) 232 of the buffer mechanism 215 is deployed to the deployed position 221. As a result, the airbag main body 232 is deployed above the occupant M as shown by the arrows a1, a1, and a space between the occupant M and the ground G is therefore ensured by the occupant rollover protection member 224. Furthermore, the deployed airbag main body 232 is interposed between the occupant M and the ground G to cushion the occupant M, making it possible to more reliably protect the head H of the occupant M.

Also, in the startup method (the first embodiment) of the occupant protection apparatus, since the specific value of $\theta 7$ or $\alpha 9$ is determined as a reference, the specific value (angle) $\theta 7$ or $\alpha 9$ can be increased to reduce the frequency of the deployment of the airbag main body 232 and to suppress deployment.

The frame support mechanism 214, including the integrally attached buffer mechanism 215, is assembled on the vehicle frame 222, as shown in FIG. 7, allowing the occupant protection apparatus 211 to be easily assembled on a vehicle frame 222.

Next, the third mode of the present invention will be described.

The "second embodiment" of the startup method of the occupant protection apparatus will now be described.

First, an occupant protection apparatus 211B that uses the startup method of the second embodiment will be described. Components similar to those in the embodiment shown in FIGS. 6 through 10 are denoted by the same numerical symbols, and descriptions thereof are omitted.

Figure 11:
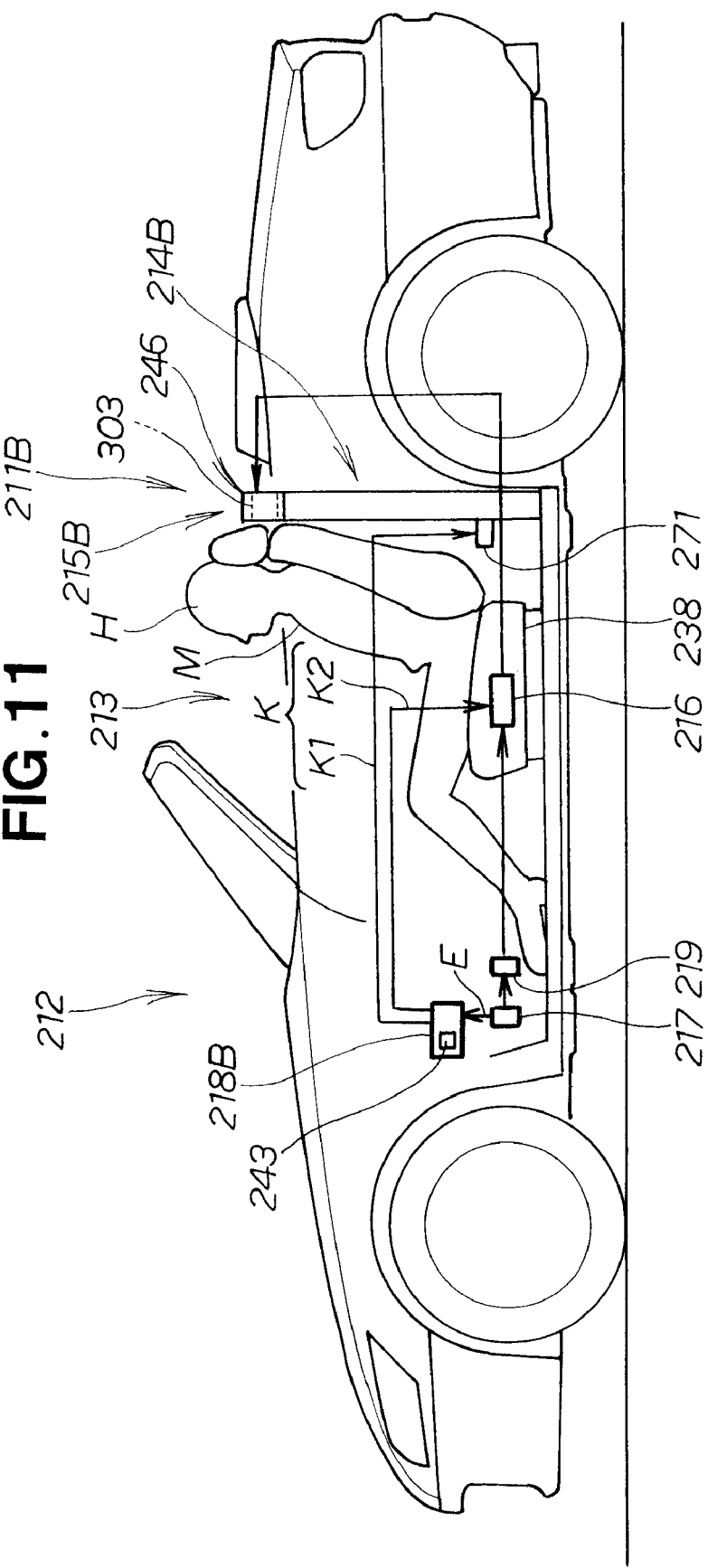
FIG. 11 is a diagram describing the startup method of a second embodiment.
Figure 12:
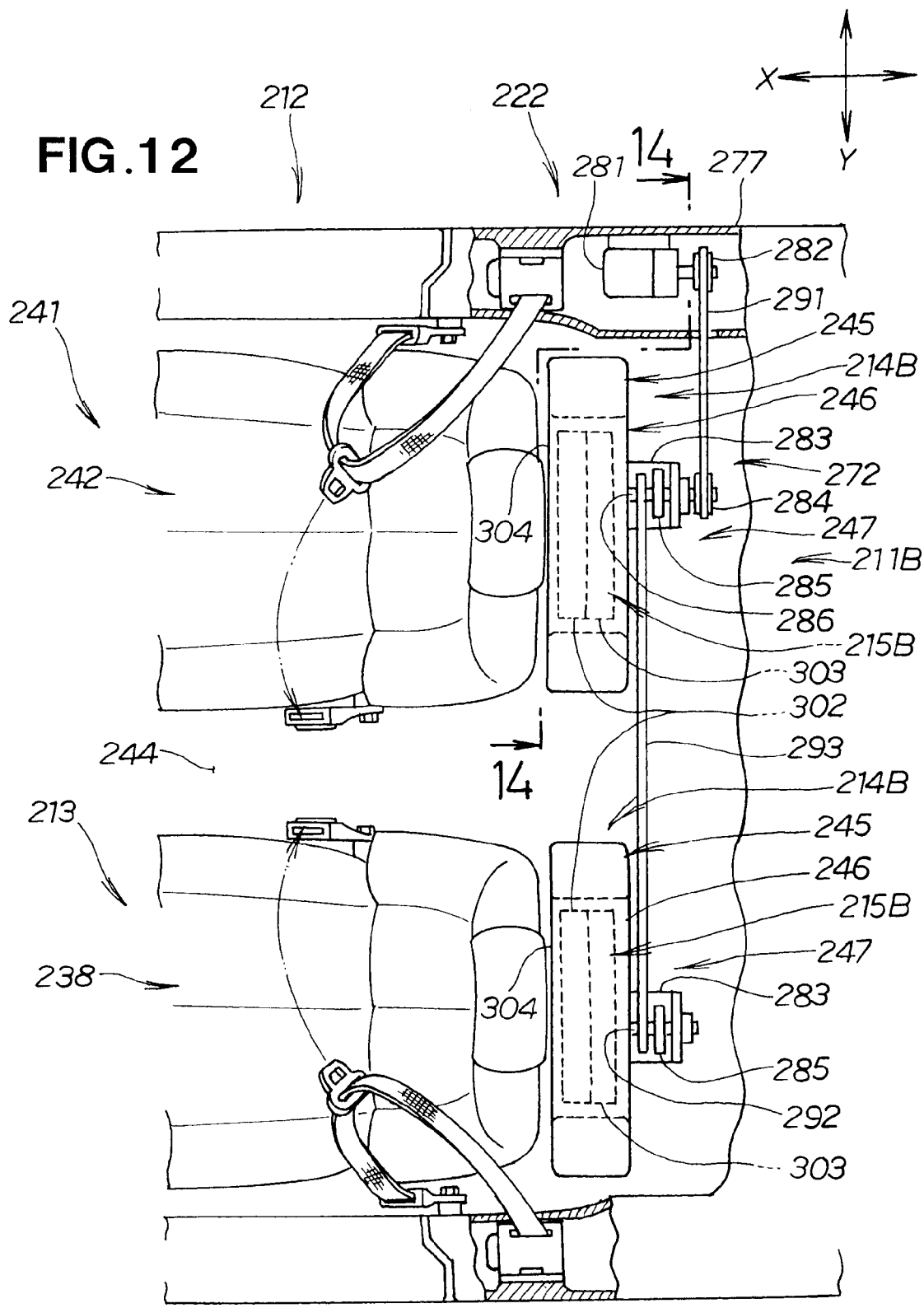
FIG. 12 is a plan view of an occupant protection apparatus operated by the startup method of the second embodiment.

The occupant protection apparatus 211B of the second embodiment shown in FIG. 11 is used in the vehicle 212. The apparatus comprises a frame-supporting mechanism 214B disposed in the seat 238 on the passenger side 213, a buffering mechanism 215B disposed on the frame-supporting mechanism 214B, a buffering member control unit 216 disposed in the center of the vehicle 212, a vehicle state detection mechanism 217, an occupant roll protection member startup control unit 218B, and a frame support mechanism 214B and buffer mechanism 215B similarly disposed in the seat 242 of the passenger side 241 (see FIG. 12).

The occupant roll protection member startup control unit 218B has the same function as the occupant roll protection member startup control unit 218, additionally includes timer means 243, and outputs a startup signal K. The timer means 243 sets the time and has an arbitrary design.

The startup signal K is composed of a first startup signal K1 that is output to first drive force generating means 271 (see FIG. 14) of the frame support mechanism 214B, and a second startup signal K2 that is output to second drive force generating means 103 (see FIG. 8) of the buffer mechanism 215B.

The frame support mechanism 214B shown in FIGS. 12 through 15 comprises a movable mechanism 245 that is disposed behind the seat 242 on the driver side 241 and that is attached to a floor panel 244, an occupant rollover protection member 246 connected to the movable mechanism 245, and a protecting member drive device 247 for operating the occupant rollover protection member 246. It is also possible for the occupant rollover protection member 246 to include the movable mechanism 245 and the protecting member drive device 247, or for the occupant rollover protection member 246 and the frame support mechanism 214B to be the same component.

The frame-supporting mechanism 214B is assembled on the vehicle frame 222 in an assembly line after the buffer mechanism 215B is integrally installed within the occupant rollover protection member 246.

The movable mechanism 245 comprises left and right sliding brace means 251, 252; a movable beam member 255 attached so as to connect together two sliding members 253, 254 that slide vertically (in the Z axis direction) within the left and right sliding brace means 251, 252; and a stationary beam member 261 attached at the bottom of stationary braces 256, 257 of the sliding brace means 251, 252.

The movable mechanism 245 also has a stopper mechanism 263 disposed between the movable beam member 255 and the right sliding brace means 252, and a buffering device 264 disposed on the stationary brace 256 of the left sliding brace means 251. The numerical symbol 265 (see FIG. 14) denotes the location where the occupant rollover protection member 246 is accommodated, and the numerical symbol 266 (see FIG. 14) denotes the location where the occupant rollover protection member 246 is supported.

The occupant rollover protection member 246 is attached so as to connect the tops of the vertically movable sliding members 253, 254 together.

The protecting member drive device 247 has a locking mechanism 272 and the first drive force generating means 271 for ejecting the occupant rollover protection member 246 by raising up the occupant rollover protection member 246 (in the Z axis direction).

In the first drive force generating means 271, a compression spring 273 is disposed between the stationary beam member 261 and the movable beam member 255, one end of a pin 274 is passed through the compression spring 273 and fixed in place in the center of the stationary beam member 261, and the other end of the pin 274 is passed through the movable beam member 255. The occupant rollover protection member 246 is thereby raised up to the support position 266 as shown by the double-dashed line (see FIG. 14).

In the locking mechanism 272, an electric motor 281 is disposed inside a right side body 277 of the vehicle frame 222, a main driving pulley 282 is attached to the electric motor 281, a driven pulley 284 and a disc 285 are integrally connected and are rotatably (in the A axis direction) attached to the stationary beam member 261 via a bracket 283, a locking pin 286 is attached at a specific distance from the center of the disc 285, a securing member 287 that is secured to the locking pin 286 is attached to the movable beam member 255, and a toothed belt 291 is wound over the driven pulley 284 and the main driving pulley 282.

Also, the disc 285 is rotatably (in the A axis direction) attached to the stationary beam member 261 on the passenger side 213 (see FIG. 12) via the bracket 283, a locking pin 292 (identical to the locking pin 286) is attached at a specific distance from the center of the disc 285, and the locking pins 292, 286 are connected by a connecting arm 293.

In the stopper mechanism 263, a securing member 295 is attached to the movable beam member 255, pawl means 296 engaged to the securing member 295 are attached to the stationary brace 257 of the right sliding brace means 252, and the raised occupant rollover protection member 246 is fixed in place at the support position 266.

Figure 16:
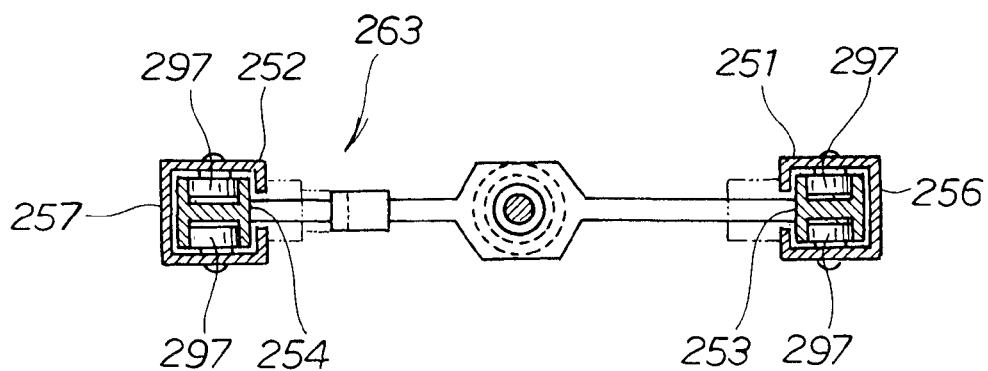
FIG. 16 is a cross-sectional view along line 16-16 in FIG. 14.

In the left sliding brace means 251 shown in FIG. 16, rollers 297, 297 are attached inside the stationary brace 256.

In the right sliding brace means 252, rollers 297, 297 are attached inside the stationary brace 257.

The sliding members 253, 254 were fitted by means of rollers 297, but the sliding members 253, 254 can also be fitted without the use of rollers 297.

The cross-sectional shapes of the stationary pillars 256, 257 are arbitrary.

The cross-sectional shapes of the sliding members 253, 254 are arbitrary.

In the buffering mechanism 215B (see FIG. 13), an airbag main body 302 as a buffering member, as well as an inflator (gas generator) 303 as second drive force creating means for deploying the airbag main body 302, are disposed inside the occupant rollover protection member 246. An opening cover 304 (also see FIG. 13) that is opened by the deployed airbag main body 302 is formed on the occupant rollover protection member 246.

The inflator (gas generator) 303 is a conventional inflator that produces reaction (combustion) gas, and is substantially identical to the inflator disposed on the instrument panel on the passenger side, for example.

An occupant protection apparatus 211B intended for the driver side 241 was described, but a movable mechanism 245 and first drive force generating means 271 are similarly (symmetrically about the center of the frame) disposed on the passenger side.

Figure 17:
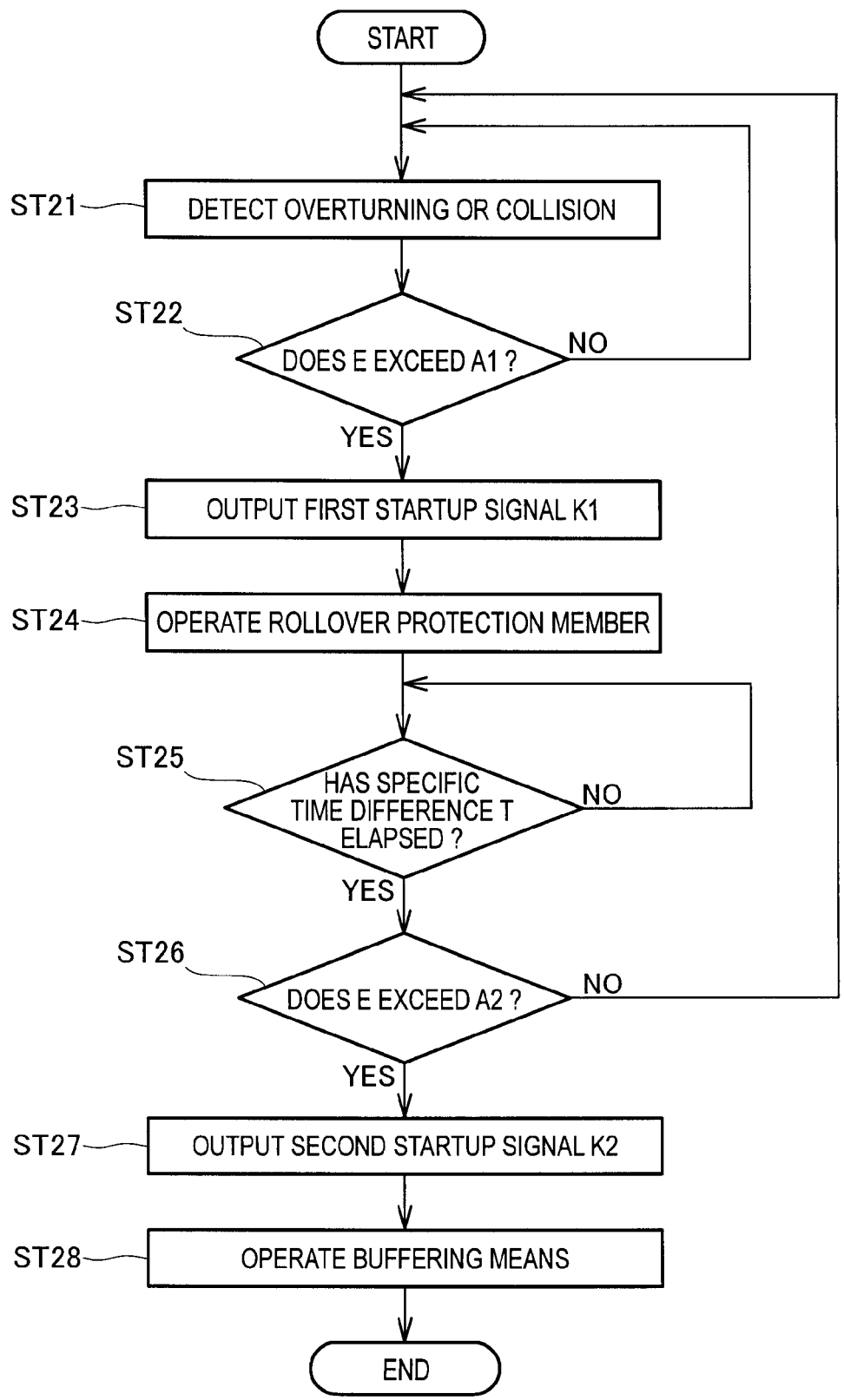
FIG. 17 is a flowchart describing the startup method of the second embodiment.

FIG. 17 depicts the startup method of the second embodiment. STxx denotes the step number. This description also refers to FIGS. 9, 11, and 14.

ST21: Collisions or overturning of the vehicle 212 are detected by the vehicle state detection mechanism 217.

ST22: The occupant roll protection member startup control unit 218B determines whether or not the overturn information E exceeds specific first values A1. If not, the process returns to ST21. If the answer is "yes," the process advances to ST23.

ST23: The occupant roll protection member startup control unit 218B outputs a first startup signal K1.

ST24: The occupant rollover protection member 246 is actuated to move to the support position 266.

ST25: The occupant roll protection member startup control unit 218B determines through the timer means 243 whether or not a specific time difference T has elapsed. If the answer is "yes," the process proceeds to ST26.

ST26: It is determined whether or not the overturn information E exceeds specific second values A2. If not, the process returns to ST21. If the answer is "yes," the process proceeds to ST27.

ST27: The occupant roll protection member startup control unit 218B outputs a second startup signal K2.

ST28: The buffering mechanism 215B is actuated to deploy the buffering member (airbag main body) 302.

The specific first values A1 include the roll angle θ and the pitch angle α shown in FIG. 9.

The specific second values A2 include the roll angle θ7 and the pitch angle α0 shown in FIG. 9.

The specific time difference T is defined as the time from the start of output of the first startup signal K1 to the start of output of the second startup signal K2. For example, the time taken for the occupant rollover protection member 246 to reach the support position 266 is set.

The overturn information E was defined as the roll angle θ and the pitch angle α, but it is also acceptable for this information to include either the roll angle θ alone, or three or more types of information. For example, the vehicle speed V may be set.

Figure 18:
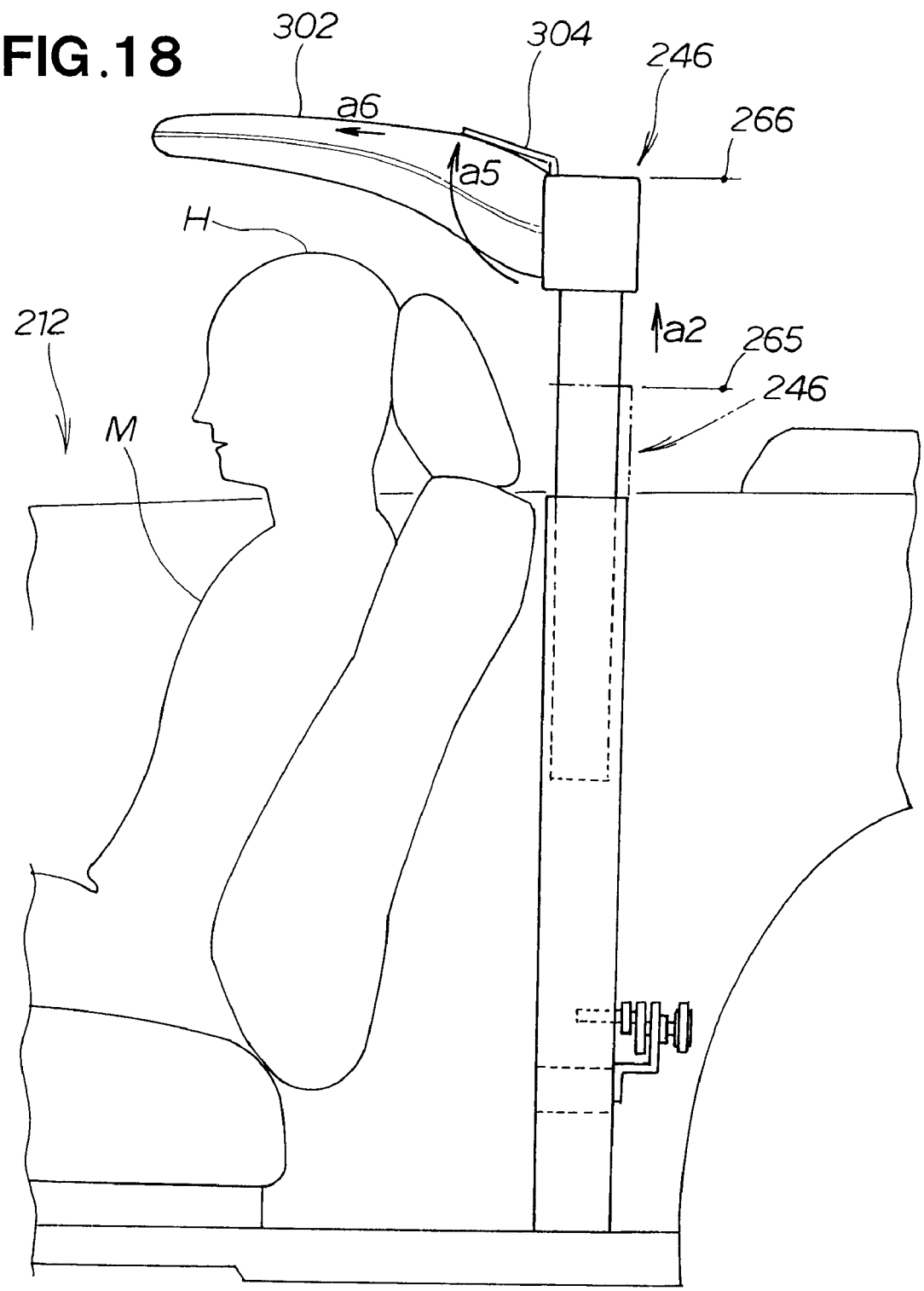
FIG. 18 is a diagram describing the state of operation according to the startup method of the second embodiment.

FIG. 18 depicts the state of operation according to the startup method of the second embodiment. This description also refers to FIGS. 11, 14, and 15.

When the vehicle 212 begins to overturn, the occupant rollover protection member 246 is ejected (in the direction of the arrow a2), and when this member reaches the support position 266, the airbag main body 302 expands. Therefore, the head H of the occupant M can be more reliably protected.

Specifically, when the vehicle 212 begins to overturn for any reason, the occupant roll protection member startup control unit 218B determines that there is a possibility of overturning on the basis of the overturn information E (e.g., θ exceeds 10° and α exceeds 50°) from the vehicle state detection mechanism 217, and the electric motor 281 is actuated by the first startup signal K1. Therefore, the locking mechanism 272 shown in FIG. 14 rotates the locking pins 292, 286 to release the lock. Then, the occupant rollover protection member 246 is raised by the compression spring 273 of the first drive force generating means 271 from the storage position 265 to the support position 266, as shown by the arrow a4.

The timer means 243 begins counting according to the first startup signal K1. When the time difference (set time) T is reached, the occupant protection apparatus 211B ends the operation by operating only the occupant rollover protection member 246 if the occupant roll protection member startup control unit 218B determines that the vehicle is not overturning on the basis of the overturn information E (e.g., θ is 70° or less and α is 90° or less) from the vehicle state detection mechanism 217.

After the elapsed time count has reached the time difference (set time) T, the occupant roll protection member startup control unit 218B operates the inflator (gas generator) 303 according to the second startup signal K2 if the occupant roll protection member startup control unit 218B determines that the vehicle is overturning on the basis of the overturn information E (e.g., θ=80° and α=91° or less) from the vehicle state detection mechanism 217. As a result, reaction gas is injected into the airbag main body 302 to expand (enlarge) the airbag. The expanding airbag main body 302 ruptures the tear lines in the opening cover 304 and opens the opening cover 304 as shown by the arrow a5, and the airbag is deployed into the space above the head H of the occupant M as shown by the arrow a6. Therefore, the head H of the occupant M can be more reliably protected.

Thus, in the startup method of the second embodiment, the occupant roll protection member startup control unit 218B outputs a startup signal K to start up the first drive force generating means 271 and the second drive force generating means (inflator) 303 of the buffering mechanism 215B in cases in which the overturn information E exceeds the specific value of θ7 or α9. The occupant rollover protection member 246 is therefore raised up, and the airbag main body 302 of the buffering mechanism 215B can be expanded (enlarged). Therefore, the head H of the occupant M can be more reliably protected.

Also, in the startup method of the second embodiment, a specific time difference T is provided between the start of output of the first startup signal K1 and the start of output of the second startup signal K2. The buffering member (airbag main body) 302 of the buffering mechanism 215B can therefore be expanded (enlarged) after the occupant rollover protection member 246 rises (as shown by the arrow a2) from the storage position 265 to the support position 266.

In the startup method of the second embodiment, the rising of the occupant rollover protection member 246 can be controlled if the occupant rollover protection member 246 is movable and the buffering mechanism 215B (including the airbag main body 302) is disposed on the movable occupant rollover protection member 246, and the deployment of the airbag main body 302 disposed on the movable occupant rollover protection member 246 can also be controlled. Therefore, the capacity to protect the occupant M can be improved more than with an occupant rollover protection member that does not have an airbag main body.

In the startup method of the second embodiment, the startup conditions thereof can be set independently since the occupant rollover protection member 246 and the buffering member (airbag main body) 302 are operated separately. For example, the occupant rollover protection member 246 can be made to operate repeatedly under conditions with a relatively low possibility of overturning, and the buffering member (airbag main body) 302 can be made to deploy only when the possibility of overturning is extremely high.

Also, in the startup method of the second embodiment, the startup conditions thereof can be set independently since the occupant rollover protection member 246 and the buffering member (airbag main body) 302 are operated separately. For example, the occupant rollover protection member 246 operates when the roll angle θ is high if information on the vehicle speed V is added to the operation control of the buffering member (airbag main body) 302. However, even if the roll angle θ is high, it is possible that the buffering member (airbag main body) 302 not be deployed when the vehicle speed V is equal to or less than a specific speed.

In the startup method of the second embodiment, the first startup signal is output when the overturn information exceeds a specific first value, and the occupant rollover protection member is actuated. The second startup signal is output when the overturn information exceeds a specific second value that is greater than the first value, and the buffering member is actuated. Therefore, in cases in which there is a possibility of overturning but the actual overturning is avoided, the second startup signal K2 is not output, and unnecessary deployment of the buffering member (airbag main body) 302 can be prevented.

Figure 13:
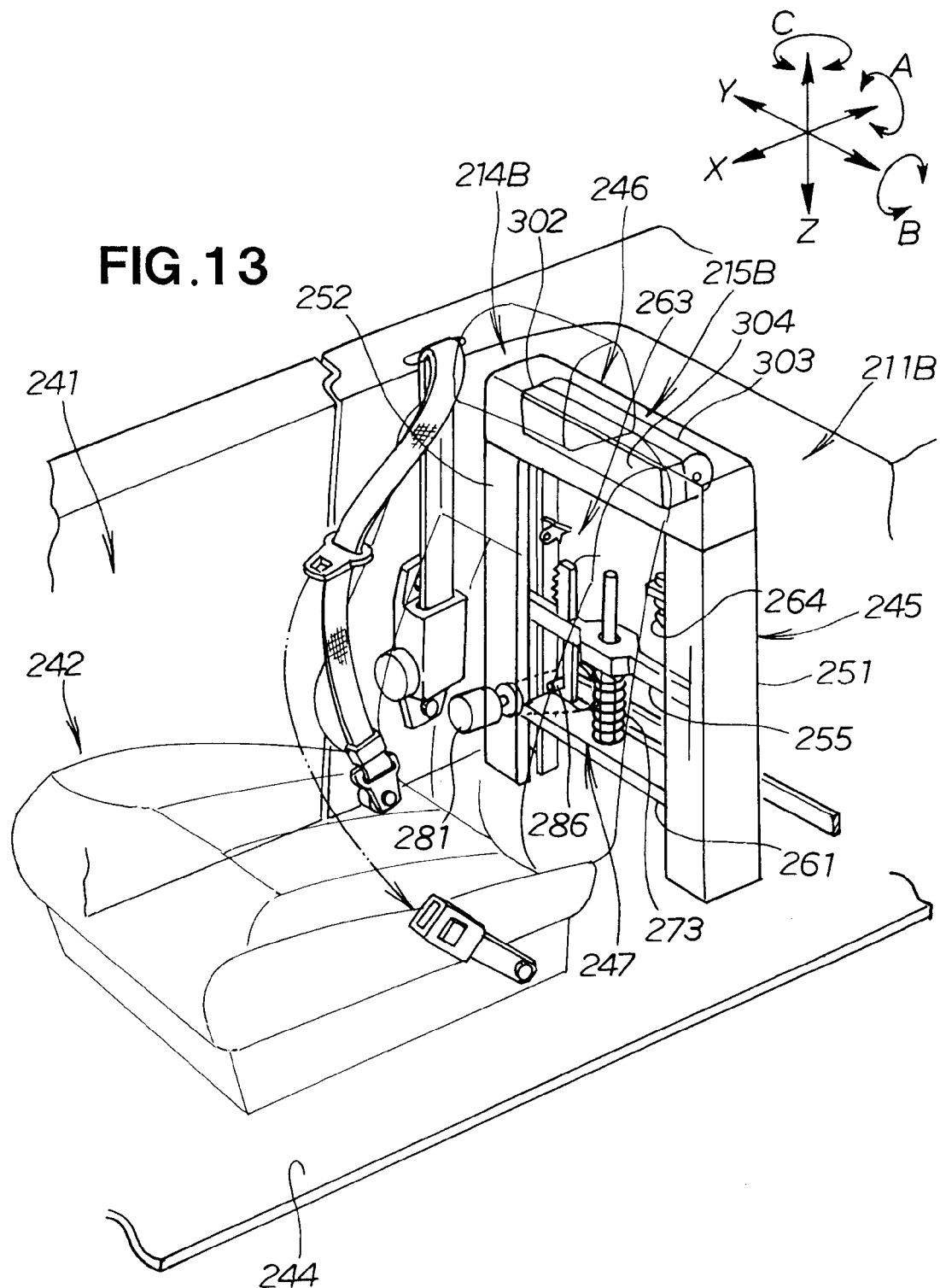
FIG. 13 is a perspective view of an occupant protection apparatus operated by the startup method of the second embodiment.

The occupant protection apparatus 211B is easily assembled on the vehicle frame 222 because the frame support mechanism 214B, including the integrally attached buffer mechanism 215B, is assembled on the vehicle frame 222, as shown in FIG. 13.

Next, the "third embodiment" of the startup method of the occupant protection apparatus will be described.

Figure 19:
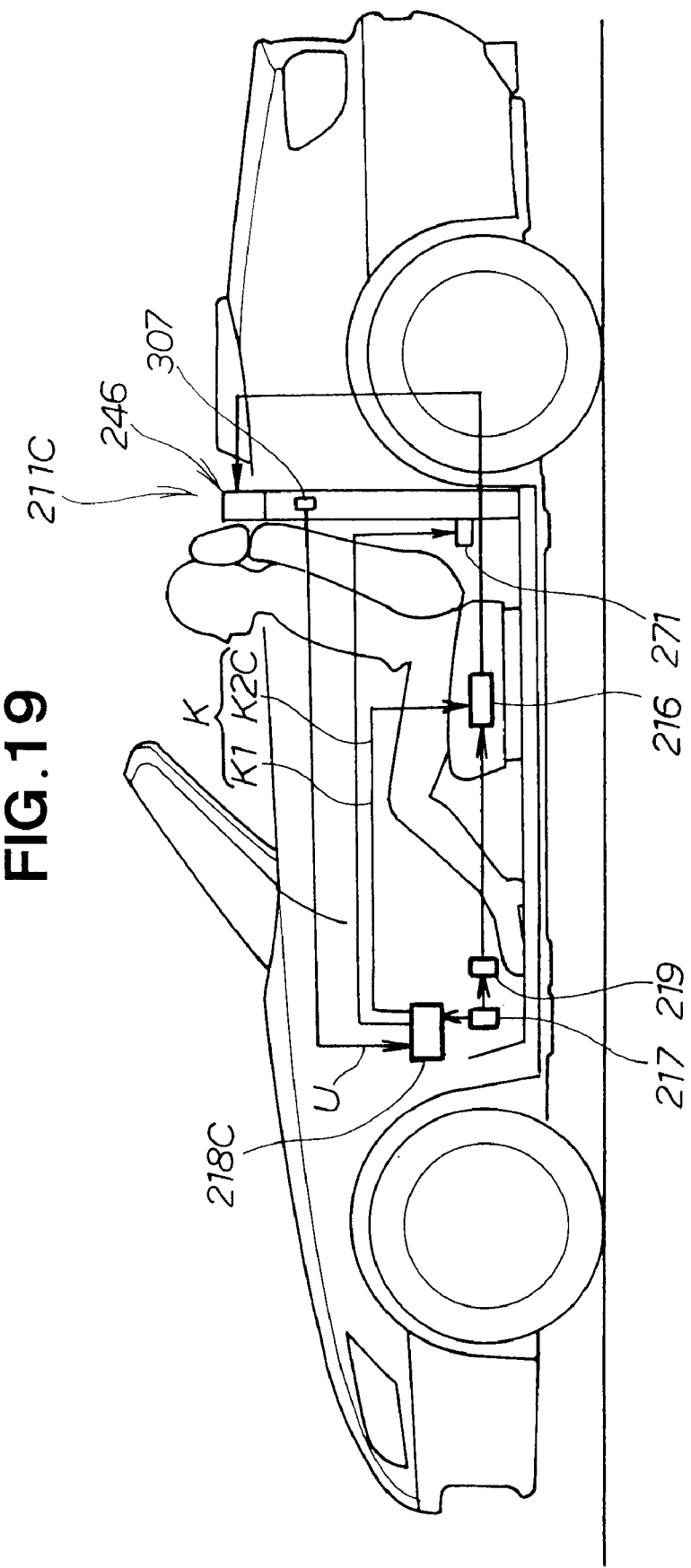
FIG. 19 is a diagram describing the startup method of the third embodiment.

FIG. 19 is a diagram describing the startup method of the third embodiment. Components similar to those of the embodiments shown in FIGS. 6 through 18 are denoted by the same numerical symbols, and descriptions thereof are omitted.

Figure 14:
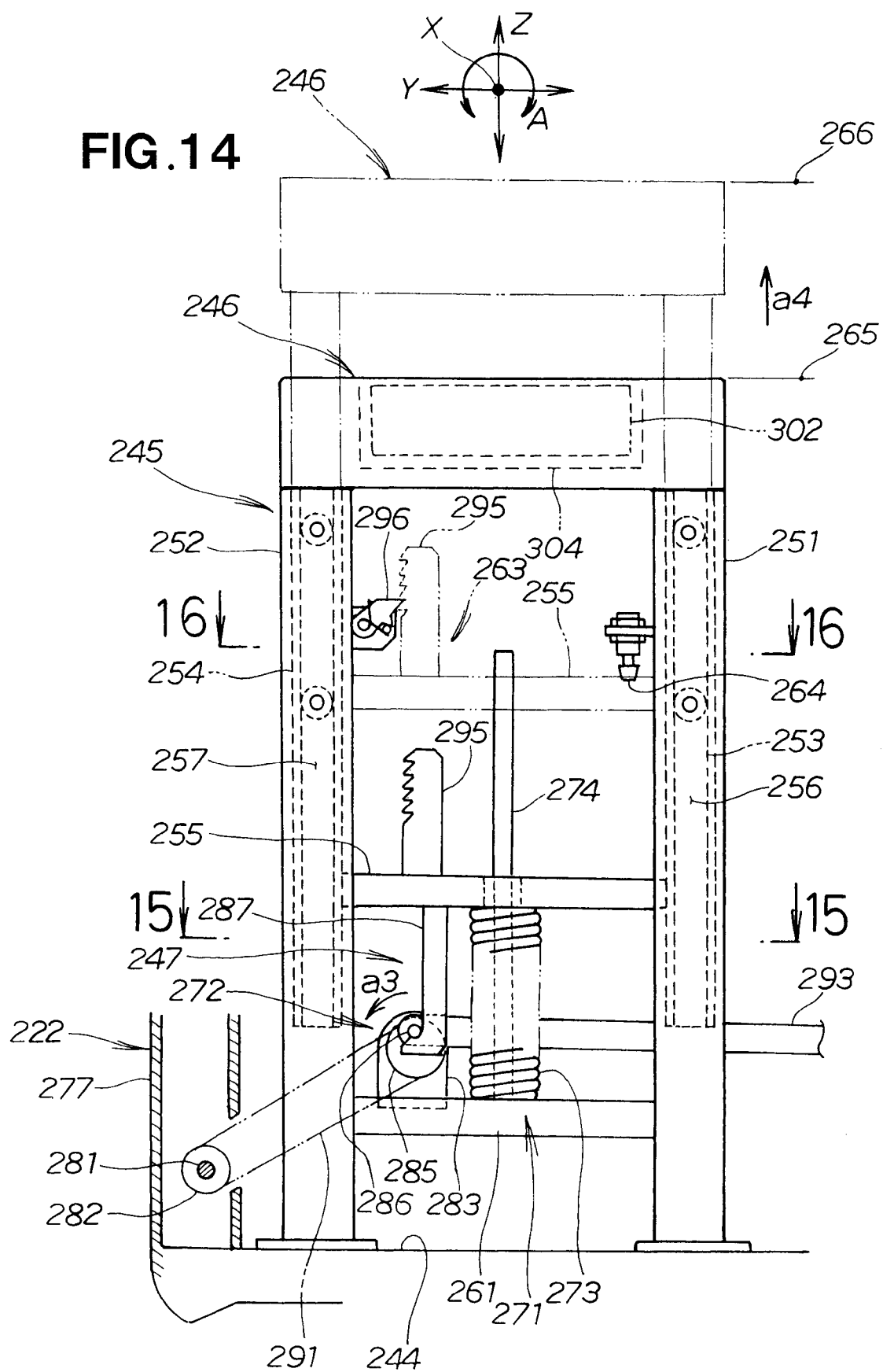
FIG. 14 is a cross-sectional view along line 14-14 in FIG. 12.
Figure 15:
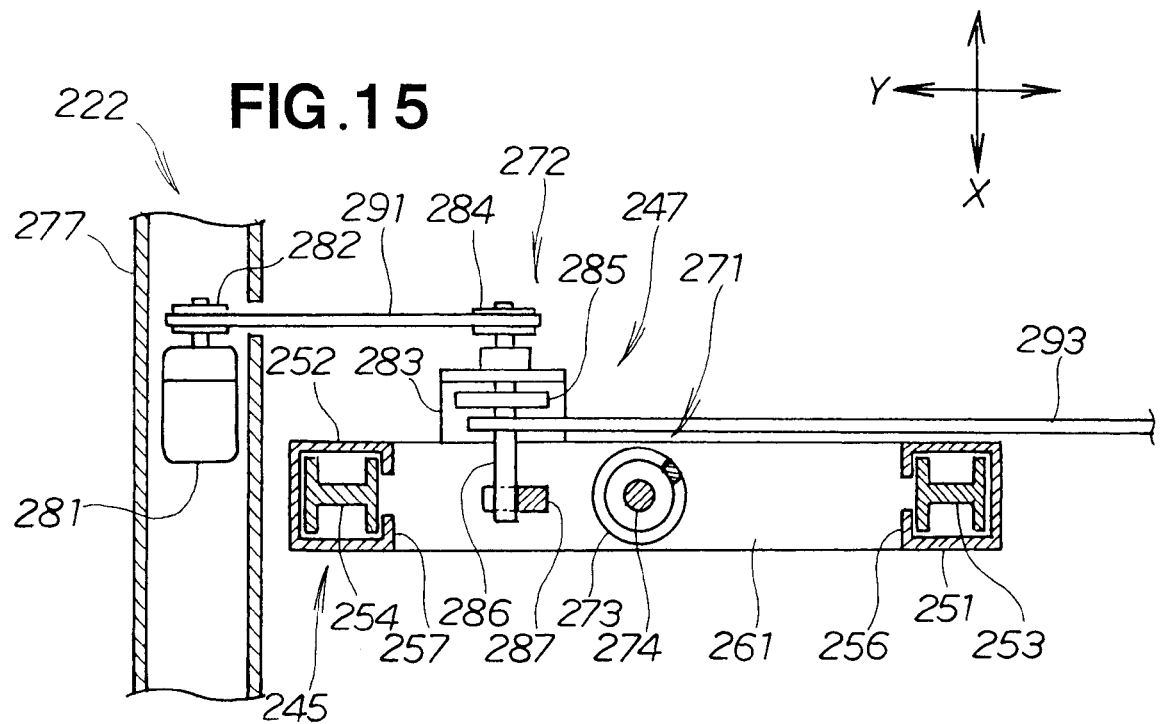
FIG. 15 is a cross-sectional view along line 15-15 in FIG. 14.
Figure 20:
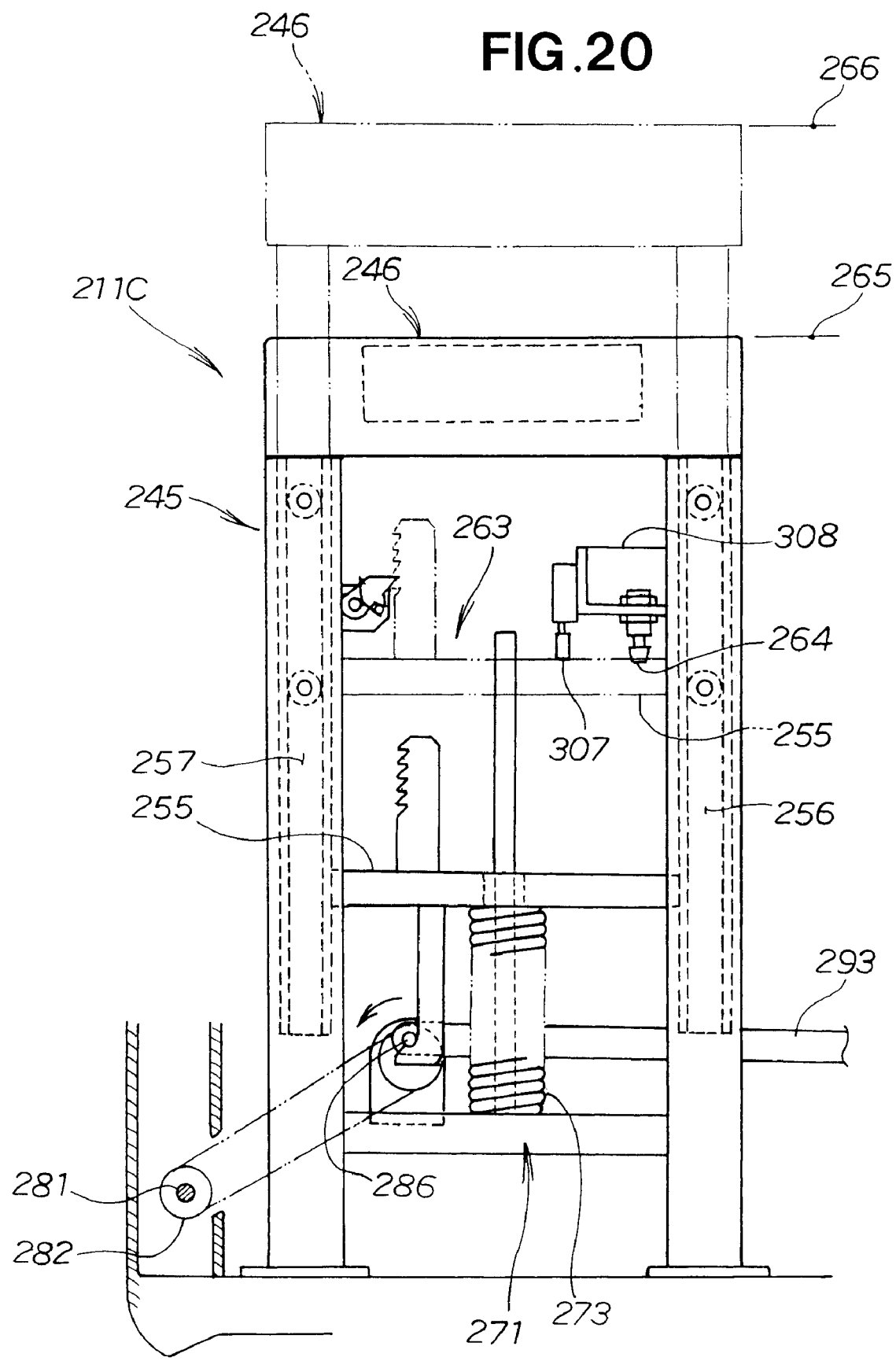
FIG. 20 is a front view of an occupant protection apparatus that uses the startup method of the third embodiment.

FIG. 20 is a front view of an occupant protection apparatus that uses the startup method of the third embodiment, and corresponds to FIG. 14.

The occupant protection apparatus 211C of the third embodiment comprises an occupant roll protection member startup control unit 218C. In addition to the functions of the occupant roll protection member startup control unit 218B, the occupant roll protection member startup control unit 218C comprises an actuation detecting mechanism 307 for detecting that the occupant rollover protection member 246 has been actuated.

The actuation detecting mechanism 307 detects that the occupant rollover protection member 246 has been actuated and reached the support position 266, and is attached to the stationary brace 256 via a bracket 308 so as to come in contact with the movable beam member 255 that has risen to a specific position.

A micro switch is used as the actuation detecting mechanism 307. A proximity switch (non-contact) can also be used.

In the startup method of the third embodiment, the movable beam member 255 pushes actuation detecting mechanism 307 when the occupant rollover protection member 246 rises to the support position 266, and the actuation detecting mechanism 307 therefore outputs a upper-limit signal U. The occupant roll protection member startup control unit 218C starts up the second drive force generating means (inflator) 303 via the buffering member control unit 216 on the basis of the upper-limit signal U, and the buffering mechanism 215B (airbag main body 302) can therefore be expanded (enlarged) after the occupant rollover protection member 246 has been reliably raised. Therefore the head H of the occupant M can be more reliably protected.

The occupant protection apparatus 211C of the third embodiment exhibits the same effects as the occupant protection apparatus 211B of the second embodiment.

In other words, the head H of the occupant M can be more reliably protected. Also, the apparatus is easily assembled on the vehicle frame 222.

In the startup method of the third embodiment, the occupant roll protection member startup control unit 218C comprises an actuation detecting mechanism 307 for detecting that the occupant rollover protection member 246 has been actuated. When the occupant rollover protection member 246 has reached a specific position (e.g., the support position 266), a second startup signal K2C is output, and the buffering member (airbag main body) 302 is deployed. Therefore, if the specific position is set as the support position 266, then the buffering member (airbag main body) 302 can be actuated after the occupant rollover protection member 246 is completely raised to the support position 266.

Next, an occupant protection apparatus (not shown) will be described, in which a movable occupant rollover protection member 246 (frame-supporting mechanism 214B) is incorporated into the occupant protection apparatus 11 shown in FIG. 1.

This assembled occupant protection apparatus uses the occupant roll protection member startup control unit 218B, wherein the stationary occupant rollover protection member 51 (frame-supporting mechanism 14) of the occupant protection apparatus 11 in FIG. 1 is replaced with the movable occupant rollover protection member 246 (frame-supporting mechanism 214B) of the occupant protection apparatus 211B shown in FIG. 11. As a result, the rising of the occupant rollover protection member can be controlled, and the deployment of the airbag main body disposed in the movable occupant rollover protection member can also be controlled, as was previously described. Therefore, the capacity to protect the vehicle occupants can be improved more than with an occupant rollover protection member 246 that does not include an airbag main body.

The assembled occupant protection apparatus preferably has an actuation detecting mechanism 307 attached. As a result, the buffering member (airbag main body) can be actuated after the occupant rollover protection member has been completely raised from the storage position to the vicinity of an occupant's head (the support position) as was previously described.

The startup method of the vehicle occupant protection apparatus according to the present invention was used in an automobile having a roof that can be opened and closed in the embodiments, but this method can also be used in vehicles having no roof, and can also be used in common vehicles.

The startup method of the vehicle occupant protection apparatus according to the present invention is suitable for convertibles and roadsters.

Obviously, various minor changes and modifications of the present invention are possible in light of the above teaching. It is therefore to be understood that within the scope of the appended claims the invention may be practiced otherwise than as specifically described.

What is claimed is:

1. An occupant protection apparatus in a vehicle with at least one seat in which at least part of a roof connected to a top end of a windshield can be opened and closed, comprising:
   an occupant rollover protection member that is attached to a vehicle frame so as to support the vehicle frame when the vehicle overturns;
   a first buffering member that is located on the occupant rollover protection member and that provides buffering action for an occupant by deploying toward the windshield, wherein the occupant rollover protection member is disposed behind a headrest of the seat that is being protected by the first buffering member;
   a first buffering member control unit that is disposed on the vehicle and that controls deployment of the first buffering member on a basis of information from a vehicle state detection mechanism for detecting a behavior of the vehicle;
   a second buffering member that is disposed in an area adjacent to the windshield and that provides buffering action for the occupant by deploying toward the occupant rollover protection member;
   a second buffering member control unit for controlling deployment of the second buffering member on a basis of information from the vehicle state detection mechanism; and
   wherein the deployed first buffering member overlaps with the deployed second buffering member.

2. The vehicle occupant protection apparatus of claim 1, wherein the occupant rollover protection member is capable of moving from a storage position to an area adjacent to the head of an occupant, and comprises an occupant roll protection member startup control unit for controlling the movable occupant rollover protection member on the basis of information from the vehicle state detection mechanism.

3. The vehicle occupant protection apparatus of claim 2, further comprising:
    an actuation detecting mechanism for detecting the operation of the movable occupant rollover protection member.

4. The vehicle occupant protection apparatus of claim 1, further comprising:
    a third buffering member that is disposed in an area adjacent to a door opening of the vehicle so as to be deployed to a side of the occupant; and
    a third buffering member control unit for controlling the deployment of the third buffering member on a basis of information from the vehicle state detection mechanism.

5. A startup method for a vehicle occupant protection apparatus for protecting an occupant, comprising the steps of:
    detecting a behavior of a vehicle with at least one seat in which at least part of a roof can be opened and closed, and
    controlling first and second buffering members that buffers the occupant when the vehicle is overturning, wherein
    the first buffering member is located in an occupant rollover protection member that is disposed behind a headrest of the seat that is being protected by the first buffering member, wherein the occupant rollover protection member is attached to a vehicle frame so as to support the frame of the vehicle when the vehicle overturns;
    the second buffering member is disposed in an area adjacent to the windshield and deploys toward the occupant rollover protection member;
    collisions, overturning, and other such behavior of the vehicle are detected by a vehicle state detection mechanism attached to the vehicle frame;
    an occupant roll protection member startup control unit determines whether overturn information from the vehicle state detection mechanism exceeds a specific value;
    startup signals are output in cases in which the overturn information exceeds the specific value; and
    drive force generating means of a buffer mechanism that deploys the first and second buffering members into a deployed position are controlled based on the startup signals and the deployed first buffering member overlaps with the deployed second buffering member.

* * * * *